United States Patent
Liang et al.

(10) Patent No.: US 9,020,145 B2
(45) Date of Patent: Apr. 28, 2015

(54) MIMO MECHANISM FOR STRONG FEXT MITIGATION

(71) Applicant: Futurewei Technologies, Inc., Plano, TX (US)

(72) Inventors: Haixiang Liang, Atherton, CA (US); Dong Wei, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 114 days.

(21) Appl. No.: 13/718,621

(22) Filed: Dec. 18, 2012

(65) Prior Publication Data

US 2014/0023190 A1 Jan. 23, 2014

Related U.S. Application Data

(60) Provisional application No. 61/674,154, filed on Jul. 20, 2012.

(51) Int. Cl.
| | | |
|---|---|---|
| *H04M 1/76* | (2006.01) | |
| *H04J 1/12* | (2006.01) | |
| *H04B 7/10* | (2006.01) | |
| *H04J 3/10* | (2006.01) | |
| *H04B 3/32* | (2006.01) | |
| *H04L 25/03* | (2006.01) | |

(52) U.S. Cl.
CPC ... *H04J 3/10* (2013.01); *H04B 3/32* (2013.01); *H04L 25/03343* (2013.01)

(58) Field of Classification Search
None
See application file for complete search history.

(56) References Cited

U.S. PATENT DOCUMENTS

| | | | |
|---|---|---|---|
| 7,673,070 B1 | 3/2010 | Kumar et al. | |
| 2008/0123755 A1 | 5/2008 | Clausen | |
| 2009/0304060 A1 | 12/2009 | Schenik | |
| 2010/0195478 A1* | 8/2010 | Schenk et al. | 370/201 |
| 2012/0020418 A1* | 1/2012 | Sands et al. | 375/259 |
| 2012/0219085 A1 | 8/2012 | Long et al. | |
| 2012/0224685 A1 | 9/2012 | Schenik | |
| 2012/0250491 A1* | 10/2012 | Goodson et al. | 370/201 |

FOREIGN PATENT DOCUMENTS

CN  1012301612 A  12/2011

OTHER PUBLICATIONS

Foreign Communication From a Counterpart Application, PCT Application No. PCT/CN2013/079785, International Search Report dated Oct. 31, 2013, 6 pages.

(Continued)

*Primary Examiner* — Fan Tsang
*Assistant Examiner* — Jeffrey Lytle
(74) *Attorney, Agent, or Firm* — Conley Rose, P.C.; Grant Rodolph; William H. Dietrich

(57) ABSTRACT

A digital subscriber line access multiplexer (DSLAM) configured to couple to a first subscriber line and a second subscriber line, wherein the DSLAM comprises at least one transmitter configured to transmit a first signal onto the first subscriber line in a first time slot, transmit a second signal onto the second subscriber line in the first time slot, wherein the first and second signals are linearly related and are intended for a first customer premise equipment (CPE), transmit a third signal onto the second subscriber line in a second time slot, and transmit a fourth signal onto the first subscriber line in the second time slot, wherein the third and fourth signals are linearly related and are intended for a second CPE.

13 Claims, 15 Drawing Sheets

(56) References Cited

OTHER PUBLICATIONS

Foreign Communication From a Counterpart Application, PCT Application No. PCT/CN2013/079785, Written Opinion dated Oct. 31, 2013, 5 pages.

Long, Guozhu, et al.; U.S. Appl. No. 13/034,353; Title: "Extremely High Speed Broadband Access Over Copper Pairs", filed Feb. 24, 2011; Specification 53 pgs.; 39 Drawing Sheets (Figs. 1-39).

"Series G: Transmission Systems and Media, Digital Systems and Networks, Digital Sections and Digital Line System-Access Networks, Self-FEXT Cancellation (Vectoring) for Use with VDSL2 Transceivers," ITU-T G.993.5, Apr. 2010, 80 pages.

* cited by examiner

MIMO MECHANISM FOR STRONG FEXT MITIGATION

CROSS-REFERENCE TO RELATED APPLICATIONS

The present application claims priority to U.S. Provisional Patent Application No. 61/674,154 filed Jul. 20, 2012 by Haixiang Liang et al. and entitled "A MIMO Mechanism for Strong FEXT Mitigation", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over existing subscriber lines. Examples of DSL systems include those defined by standards including asymmetric DSL 2 (ADSL2), very-high-speed DSL (VDSL), very-high-speed DSL 2 (VDSL2), G.vector, and G. fast, which is a future standard to be issued by the International Telecommunication Union Telecommunication Standardization Sector (ITU-T) Study Group 15 (SG15). These broadband access communication technologies may provide data for triple-play services, including television, internet, voice over internet protocol (VoIP) phone. When transmitting data over the subscriber lines, crosstalk interference can occur between the transmitted signals over adjacent twisted-pair subscriber lines, for example in a same or nearby bundle of lines. Crosstalk, including near-end crosstalk (NEXT) and far-end crosstalk (FEXT), may limit the performance of various DSL systems. For example, although channel capacity in the physical media dependent (PMD) layer of a DSL system may be high (e.g., near gigabits in G.fast) with a single subscriber line, when multiple subscriber lines are deployed in a same binder, actual data rate may be lower than the channel capacity due to NEXT and/or FEXT.

NEXT may be reduced or canceled via the use of synchronous time division duplexing (STDD). In the STDD mode, all subscriber lines connected to, for example, a transceiver (transmitter and receiver) located in a digital subscriber line access multiplexer (DSLAM) may be configured to either transmit downstream signals or receive upstream signals at any given time, but not simultaneously. A transceiver located in a customer premise equipment (CPE) may be configured similarly. Therefore, for the transceiver either in a DSLAM or CPE, it may either be in a transmitting mode or receiving mode. Downstream and upstream time division may allow a transceiver to avoid its own transmitter echo, and STDD may help prevent NEXT between subscriber lines.

On the other hand, FEXT may be reduced or canceled by joint processing of signals in multiple subscriber lines. Depending on whether the signals are in a downstream or upstream direction, a crosstalk precoder or canceller may be used on an operator's end of a DSL system, such as a DSLAM. For example, crosstalk precoding is a technique in which downstream signals are pre-distorted prior to transmission through a binder. A precoding matrix comprising precoder coefficients may be used to pre-distort the signals, and thus cancel FEXT that occurs between subscriber lines in the binder. The signals may then arrive at receivers located at different customer sites with reduced FEXT, thereby achieving higher data-rates.

In today's VDSL2/G.vector products, it may have been assumed that FEXT is relatively small compared to an intended user data signal. Consequently, a linear precoder and canceller may be able to cancel most or all of the FEXT. However, in customer lab tests and field trials, it has been shown that this assumption is not always true. For example, as the number of subscriber lines in a binder increases, the levels of FEXT among the subscriber lines may increase. Sometimes, the FEXT levels may become stronger than an intended signal component. In this case, the FEXT precoder/canceller coefficients may have large magnitudes, which may affect a signal component at the receiver, potentially reducing a signal-to-noise ratio (SNR). For another example, FEXT may be relatively stronger in some high frequency subcarriers. Thus, the FEXT cancellation issue may be worse in DSL systems, e.g., G.fast, which increases the high frequency band edge from, for example, 17/30 megahertz (MHz) used in VDSL2 to 100 MHz or higher. Consequently, there may be a need for improved FEXT compensation in DSL systems.

SUMMARY

In one embodiment, the disclosure includes a digital subscriber line access multiplexer (DSLAM) configured to couple to a first subscriber line and a second subscriber line, wherein the DSLAM comprises at least one transmitter configured to transmit a first signal onto the first subscriber line in a first time slot, transmit a second signal onto the second subscriber line in the first time slot, wherein the first and second signals are linearly related and are intended for a first customer premise equipment (CPE), transmit a third signal onto the second subscriber line in a second time slot, and transmit a fourth signal onto the first subscriber line in the second time slot, wherein the third and fourth signals are linearly related and are intended for a second CPE.

In another embodiment, the disclosure includes a DSLAM configured to couple to a first subscriber line and a second subscriber line, wherein the DSLAM comprises at least one receiver configured to receive a first signal from the first subscriber line in a first time slot, receive a second signal from the second subscriber line in the first time slot, wherein the first and second signals are intended for a first central office (CO) transceiver, receive a third signal from the first subscriber line in a second time slot, and receive a fourth signal from the second subscriber line in the second time slot, wherein the third and fourth signals are intended for a second CO transceiver.

In yet another embodiment, the disclosure includes a DSLAM configured to couple to a first subscriber line and a second subscriber line, wherein the DSLAM comprises at least one transmitter configured to transmit a first signal onto the first subscriber line in a time slot, and transmit a second signal onto the second subscriber line in the time slot, wherein a first component of the first signal and a first component of the second signal comprise a first set of subcarriers, are linearly related, and are intended for a first CPE, and wherein a second component of the first signal and a second component of the second signal comprise a second set of subcarriers, are linearly related, and are intended for a second CPE, and wherein the first and second sets of subcarriers occupy different frequency bands.

In yet another embodiment, the disclosure includes a method, implemented by a DSLAM configured to couple to a first subscriber line and a second subscriber line, comprising receiving a first signal from the first subscriber line in a time slot, and receiving a second signal from the second subscriber line in the time slot, wherein a first component of the first signal and a first component of the second signal comprise a first set of subcarriers and are intended for a first central office (CO) transceiver, and wherein a second component of the first signal and a second component of the second signal comprise a second set of subcarriers and are intended for a second CO transceiver, and wherein the first and second sets of subcarriers occupy different frequency bands.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Depending on the supported standard, a DSL system may be denoted as an xDSL system, where 'x' may indicate any DSL standard. For instance, 'x' stands for 'A' in ADSL2 or ADSL2+ systems, and stands for 'V' in VDSL or VDSL2 systems. When a transceiver is located in at an operator end of the DSL system, including a central office (CO), exchange, DSLAM, or cabinet, it may be referred to as an xTU-C. On the other hand, when a transceiver is located at a remote or user end such as a customer premise equipment (CPE), the transceiver may be referred to as an xTU-R. For example, if the DSL system is a VDSL2 system, a CO transceiver may then be referred to as a VDSL2 transceiver unit at an optical network unit (VTU-O). Sometimes, a VTU-O may also be interchangeably referred to as a VTU at a central office (VTU-C). Similarly, in the VDSL2 system, a CPE transceiver may be referred to as a VTU at a remote terminal (VTU-R).

In a DSL system, data may be communicated between a CPE and an upstream source through an xTU-C. A DSLAM may serve as an intermediary to facilitate data communication, e.g., between a plurality of xTU-Rs and a plurality of xTU-Cs which may reside in a common CO. The DSLAM may comprise a downstream section and an upstream section, which are configured to operate in the downstream and upstream directions respectively. One end of the DSLAM may be coupled to each of multiple xTU-C via a subscriber line, and the other end of the DSLAM may be coupled to each of multiple CPEs via a subscriber line.

Figure 1:
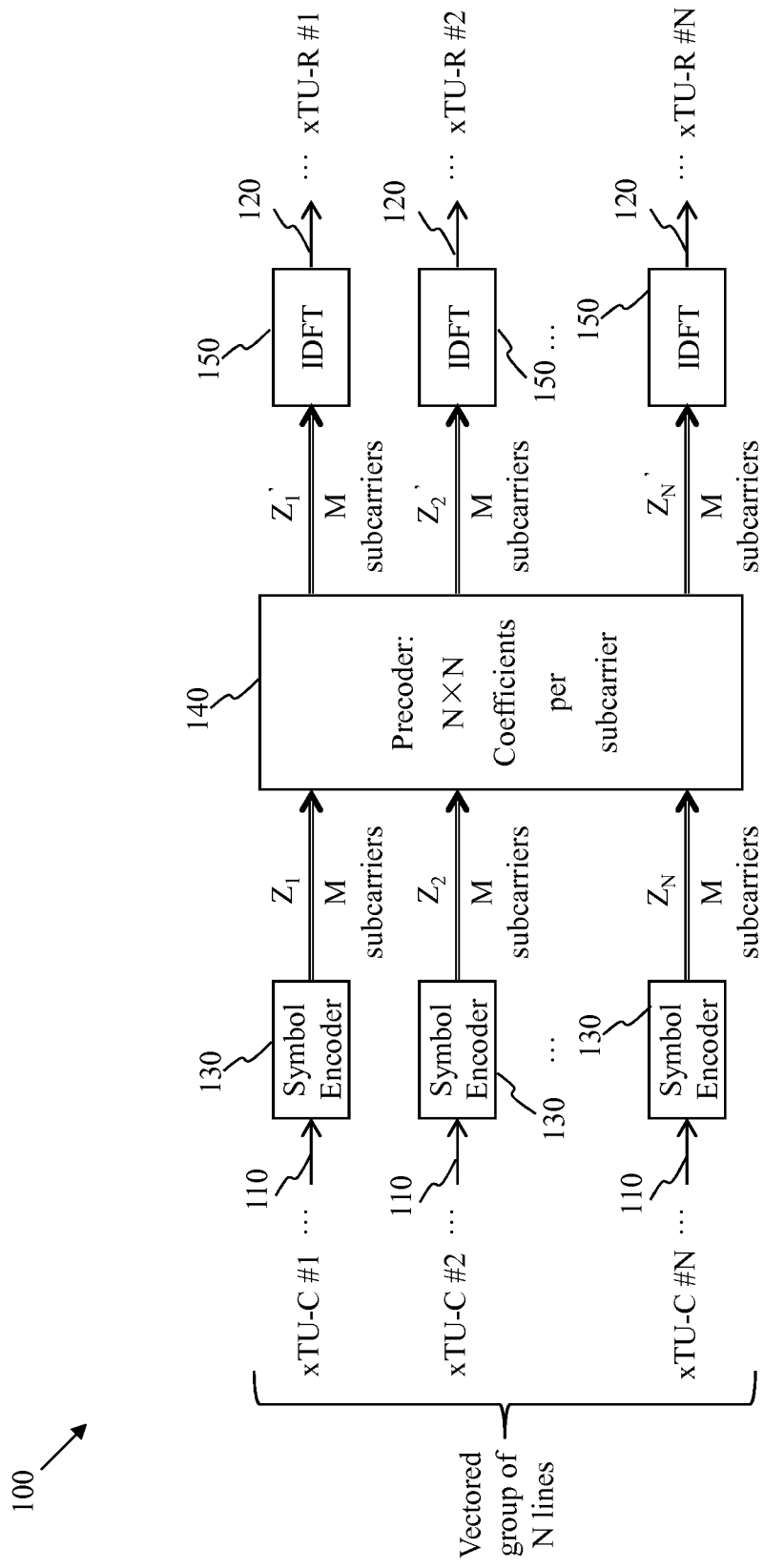
FIG. 1 illustrates a downstream section of a DSLAM.

FIG. 1 illustrates a downstream section 100 of a DSLAM. The downstream section 100 may be configured to receive downstream signals from N ingress subscriber lines 110 coupled to N xTU-Cs, process the signals, and transmit processed signals onto N egress subscriber lines 120 coupled to N xTU-Rs, where N is an integer greater than one. The N ingress subscriber lines 110 may be considered a vectored group of lines, since their signals may be jointly processed in the DSLAM to cancel downstream FEXT. The downstream section 100 may comprise a symbol encoder 130 for each subscriber line 110. Thus, an incoming bit stream in a line 110, carrying data from an upstream source, may be encoded by its corresponding symbol encoder 130. The symbol encoder may divide the incoming bit stream into small groups of bits, wherein each group may be assigned to be modulated onto a sub-carrier of a digital multi-tone (DMT) symbol. A number of subcarriers in each line may be denoted herein as M, where M is an integer.

Encoded symbols in the group of lines may feed into a precoder 140, which is configured to linearly combine signals from each line and produce signals to inverse discrete Fourier transform (IDFT) blocks 150. The precoder 140 may be a MIMO system in the frequency domain. Each IDFT block 150 may be used for DMT modulation, which converts M symbols in the frequency domain to M signals in the time domain. The time domain signals are transmitted onto the subscriber lines 120. In the downstream section 100, the time-domain signals may be intended for a plurality of CPE receivers.

Specifically, the precoder 140 may compute multiple outputs (denoted as $Z'_j(k)$, where $j=1, 2, \ldots, N$ and $k=1, 2, \ldots, M$) from multiple inputs (denoted as $Z_i(k)$, where $i=1, 2, \ldots, N$) using equation:

$$Z'_j(k) = \sum_{i=1}^{N} p(i, j, k) \times Z_i(k) \quad j = 1, 2, \ldots, N; k = 1, 2, \ldots, M \qquad (1)$$

where each $p(i, j, k)$ refers to a precoder coefficient from input i to output j on subcarrier k. Each precoding coefficient is a complex number with a phase and magnitude. In the frequency domain, each $Z_j(k)$ may also be a complex number, thus its cross product with a precoder coefficient may result in a complex number $Z'_j(k)$.

Figure 2:
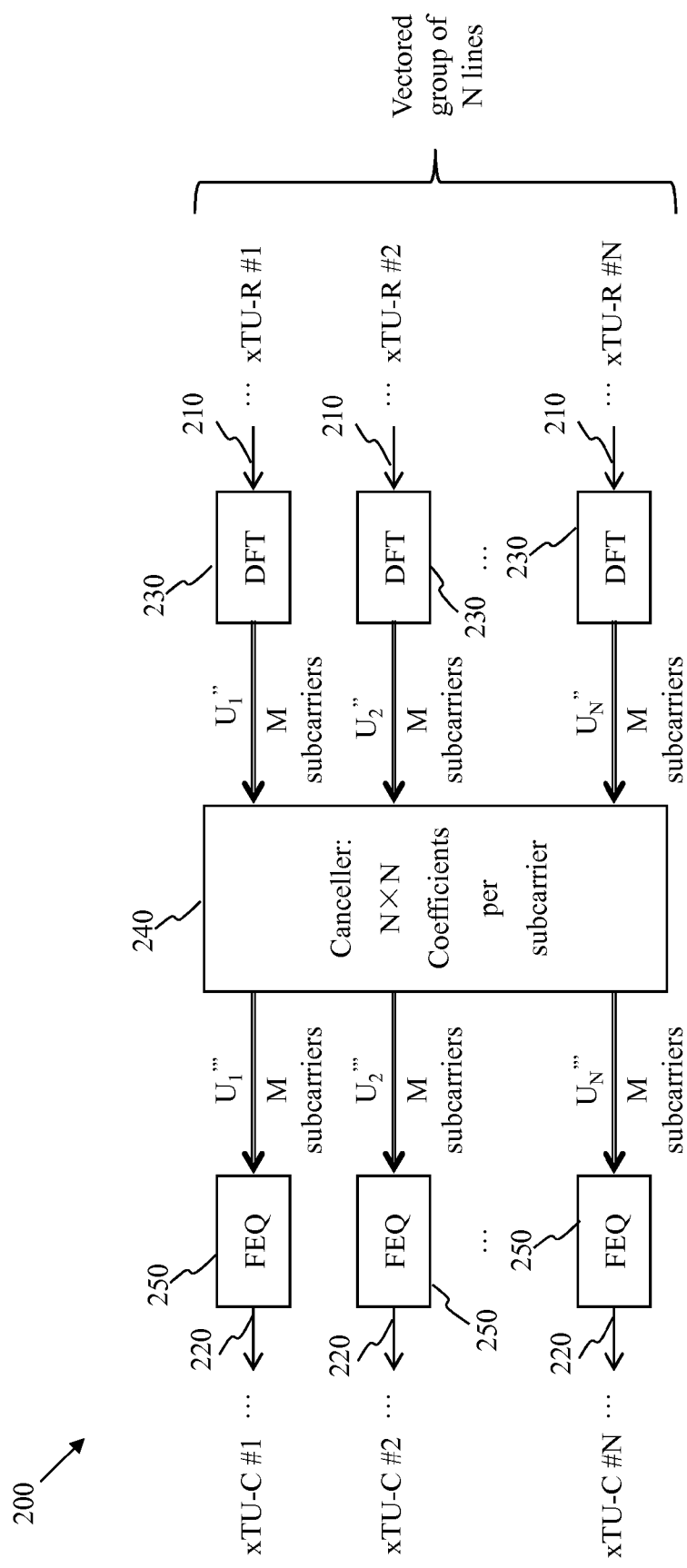
FIG. 2 illustrates an upstream section of a DSLAM.

FIG. 2 illustrates an upstream section 200 of a DSLAM. The upstream section 200 may be configured to receive upstream signals from N ingress subscriber lines 210 coupled to N xTU-Rs, process the signals, and transmit processed signals onto N egress subscriber lines 220 coupled to N xTU-Cs. The N ingress subscriber lines 210 may be considered a vectored group of lines, since their signals may be jointly processed in the DSLAM to cancel upstream FEXT. The upstream section 200 may comprise a discrete Fourier transform (DFT) block 230 for each ingress subscriber line 210. Thus, a time-domain signal in a line 210, carrying data from a CPE, may be processed by its corresponding DFT block 230 to convert M signals in the time domain to M symbols in the frequency domain.

Frequency domain symbols in the N lines may feed into a canceller 240, which may be configured to linearly combine signals from each line and produce signals to frequency-domain equalizers (FEQs) 250. Through the FEQs 250, the symbols may be equalized using appropriate equalization schemes and then forwarded to xTU-Cs. Similar to the precoder 140, the canceller 240 is also a MIMO system in the frequency domain. Specifically, the canceller 240 may compute multiple outputs (denoted as $U'''_j(k)$, where j=1, 2, ..., N and k=1, 2, ..., M) from multiple inputs (denoted as $U''_i(k)$, where i=1, 2, ..., N) using equation:

$$U'''_j(k) = \sum_{i=1}^{N} c(i,j,k) \times U''_i(k) \quad j=1,2,\ldots,N; k=1,2,\ldots,M \quad (2)$$

where each c(i, j, k) refers to a canceller coefficient from input i to output j on subcarrier k. Each canceling coefficient is a complex number with a phase and magnitude, thus its cross product with an input signal may result in a complex number.

Figure 3:
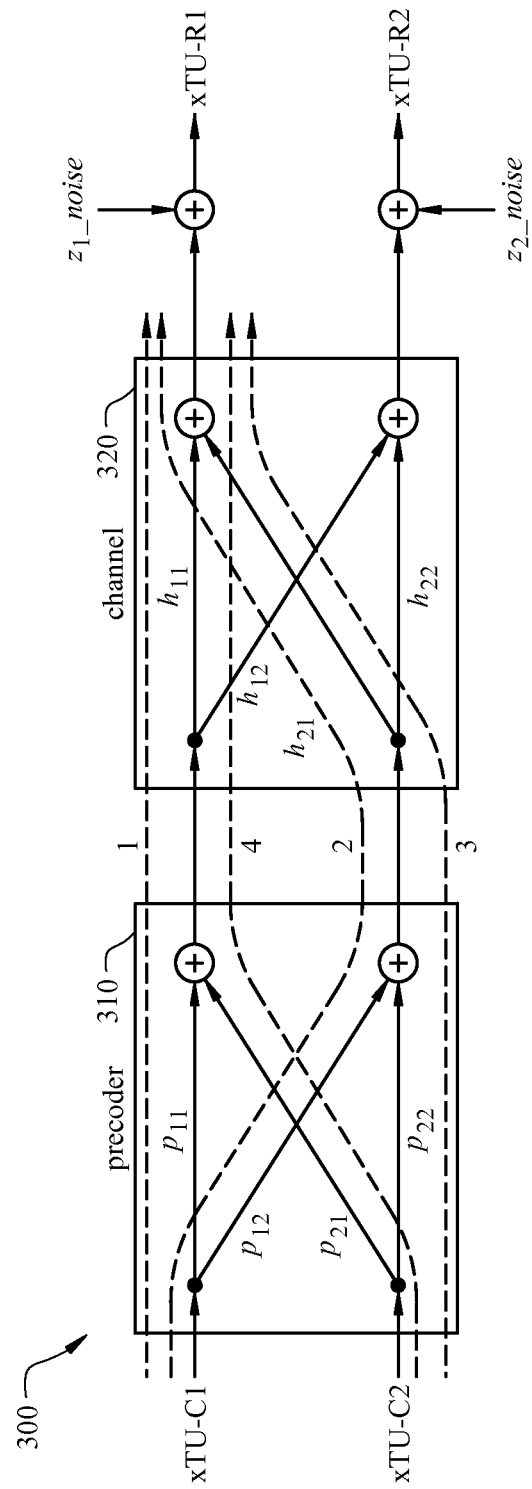
FIG. 3 illustrates a downstream multiple-input multiple-output (MIMO) scheme.

FIG. 3 illustrates a downstream MIMO scheme 300, which may be implemented to cancel downstream FEXT. For the purpose of illustration, suppose there are two subscriber lines in the MIMO scheme: a first line (denoted as Line 1) connecting a first xTU-C (denoted as xTU-C1) and a first xTU-R (denoted as xTU-R1), and a second line (denoted as Line 2) connecting a second xTU-C (denoted as xTU-C2) and a second xTU-R (denoted as xTU-R2). Note that the first and second xTU-Cs may be located in a same device (e.g., a CO) or different devices. Each of the two subscriber lines may comprise several sections, each of which may carry a different signal representing the same user data.

The MIMO scheme 300 comprises a precoder 310, which is a 2×2 MIMO system. Specifically, in a certain time slot or slice, the precoder 310 may be configured to generate two output signals, denoted as $Z'_1$ and $Z'_2$, from two input signals, denoted as $Z_1$ and $Z_2$, using equations:

$$Z'_1 = p_{11} \times Z_1 + p_{21} \times Z_2 \quad (3)$$

$$Z'_2 = p_{12} \times Z_1 + p_{22} \times Z_2 \quad (4)$$

where $p_{11}$, $p_{21}$, $p_{12}$, and $p_{22}$ refer to precoder coefficients, each of which is a complex number with a phase and magnitude. In the frequency domain, $Z_1$ and $Z_2$ may also be complex numbers, thus their cross product with the precoder coefficients may result in complex numbers (i.e., $Z'_1$ and $Z'_2$). Since the same MIMO scheme 300 may be applied to each subcarrier, the subcarrier index k may be removed in FIG. 3 (i.e., p(i, j, k) is represented by $p_{ij}$ and $Z'_j(k)$ represented by $Z'_j$).

The output signals may be transmitted from a DSLAM, wherein the precoder 310 resides. After propagating in a downstream channel 320, the phase and/or magnitude of the output signals may be changed. For example, $Z'_1$ and $Z'_2$ may be changed to two new signals denoted as $Z''_1$ and $Z''_2$ following equations:

$$Z''_1 = h_{11} \times Z'_1 + h_{21} \times Z'_2 \quad (5)$$

$$Z''_2 = h_{12} \times Z'_1 + h_{22} \times Z'_2 \quad (6)$$

where $h_{11}$ and $h_{22}$ refer to downstream channel transfer functions or gains, and $h_{21}$ and $h_{12}$ refer to downstream FEXT coefficients. The $h_{11}$, $h_{21}$, $h_{12}$, and $h_{22}$ may depend on subcarriers, however, since the same MIMO scheme 300 may be applied to each subcarrier, the subcarrier index k may be removed from these parameters in FIG. 3. There may also be additive noise components. For the purpose of this analysis, the noise components may be ignored.

Thus, based on equations (3)-(6), we have:

$$\begin{aligned} Z''_1 &= h_{11} \times (p_{11} \times Z_1 + p_{21} \times Z_2) + h_{21} \times (p_{12} \times Z_1 + p_{22} \times Z_2) \\ &= h_{11} \times p_{11} \times Z_1 + h_{21} \times p_{12} \times Z_1 + h_{21} \times p_{22} \times Z_2 + h_{11} \times p_{21} \times Z_2 \end{aligned} \quad (7)$$

$$\begin{aligned} Z''_2 &= h_{12} \times (p_{11} \times Z_1 + p_{21} \times Z_2) + h_{22} \times (p_{12} \times Z_1 + p_{22} \times Z_2) \\ &= h_{12} \times p_{11} \times Z_1 + h_{22} \times p_{12} \times Z_1 + h_{22} \times p_{22} \times Z_2 + h_{12} \times p_{21} \times Z_2 \end{aligned} \quad (8)$$

It can be seen from equations (7) and (8) that each of the signals $Z''_1$ and $Z''_2$ may comprise four components. As show in FIG. 3, there may be two signal paths from the xTU-C1 to the xTU-R1 and two signal paths from the xTU-C2 to the xTU-R1, which correspond to the four signals or components of $Z''_1$ in equation (7). A first path corresponding to the term $h_{11} \times p_{11} \times Z_1$ may be a main signal path from the xTU-C1 to the xTU-R1, a second path corresponding to the term $h_{21} \times p_{12} \times Z_1$ may be a second-order signal path from the xTU-C1 to the xTU-R1, a third path corresponding to the term $h_{21} \times p_{22} \times Z_2$ may be a downstream FEXT path from the xTU-C2 to the xTU-R1, and a fourth path corresponding to the term $h_{11} \times p_{21} \times Z_2$ may be a precoding path from the xTU-C2 to the xTU-R1. The fourth path may be designed to reduce the downstream FEXT. For example, the precoder coefficient $p_{21}$ may be configured such that the term $h_{11} \times p_{21} \times Z_2$ has an opposite phase with the term $h_{21} \times p_{22} \times Z_2$. Although not shown in FIG. 3, it should be noted that four signal paths to the xTU-R2 may be similarly determined corresponding to the four terms in equation (8).

In practice, when the downstream FEXT is relatively strong (e.g., $h_{21}$ has high magnitude), the second-order signal components (e.g., $h_{21} \times p_{12} \times Z_1$ from the xTU-C1 to the xTU-R1 and $h_{12} \times p_{21} \times Z_2$ from the xTU-C2 to the xTU-R2) may have high magnitudes. In this case, FEXT cancellation for one xTU-R may affect the total level of signal intended for another xTU-R. For example, when $p_{21}$ is calibrated to cancel the FEXT path for xTU-R1 (by designing $h_{11} \times p_{21} \times Z_2$ to have opposite phase with $h_{21} \times p_{22} \times Z_2$), it may affect a second-order signal intended for xTU-R2 (i.e., $h_{12} \times p_{21} \times Z_2$ in equation (8)). If the second-order signal for xTU-R2 has an opposite phase with its main signal $h_{22} \times p_{22} \times Z_2$, then the total signal level that can be received by xTU-R2 is reduced because of $p_{21}$, which is an undesired consequence.

In addition to the second-order signal effect, if strong downstream FEXT exists, a total power transmitted from the DSLAM for each line may exceed a specified power spectrum density (PSD) mask, which may further complicate calculation and tracking of precoder coefficients. Thus, new MIMO schemes may be needed for improved power control.

Figure 4:
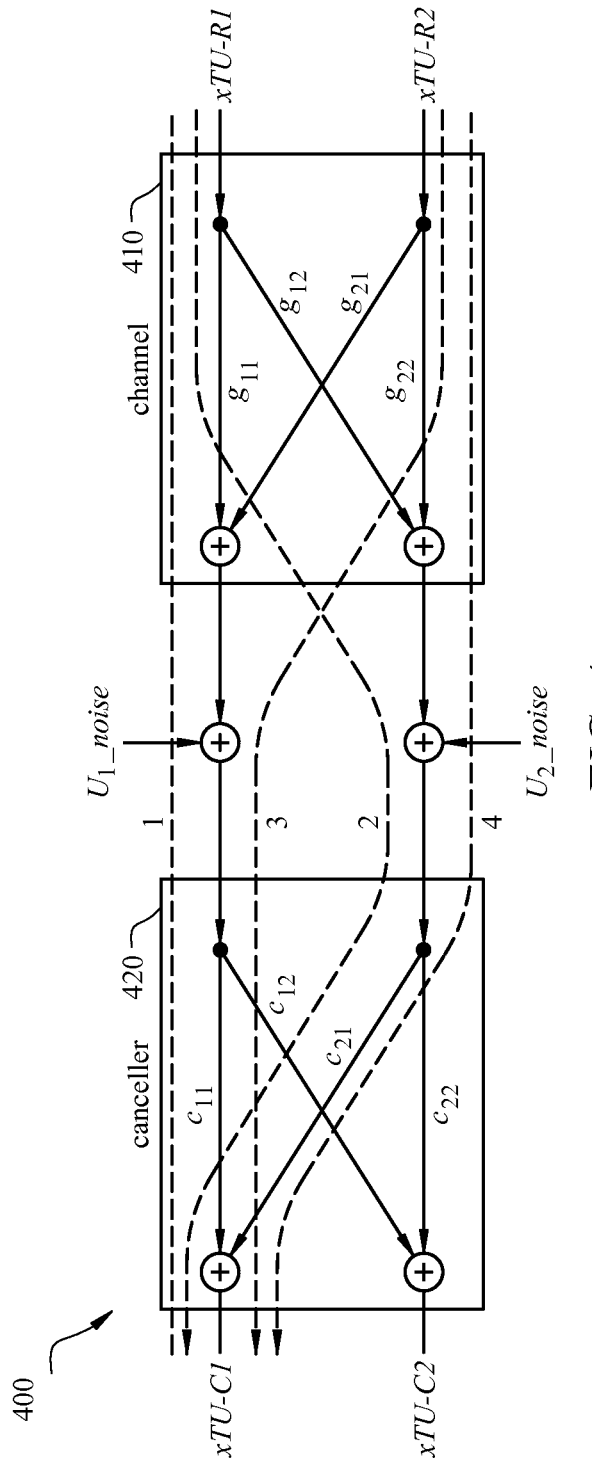
FIG. 4 illustrates an upstream MIMO scheme.

Similar issues can be found with the existing design of a canceller in the upstream direction. FIG. 4 illustrates an upstream MIMO scheme 400, in which some aspects may be similar to the MIMO scheme 300. In the interest of conciseness, only the different aspects will be further described. In the upstream MIMO scheme 400, two signals transmitted by the xTU-R1 and xTU-R2 may propagate through an upstream channel 410, in which upstream FEXT may affect each of the two signals. For example, two signals (denoted as $U_1$ and $U_2$) may be changed to two new signals (denoted as $U'_1$ and $U'_2$) after propagation following equations:

$$U'_1 = g_{11} \times U_1 + g_{21} \times U_2 \quad (9)$$

$$U'_2 = g_{12} \times U_1 + g_{22} \times U_2 \quad (10)$$

where $g_{11}$ and $g_{22}$ refer to upstream channel transfer functions or gains, and $g_{21}$ and $g_{12}$ refer to upstream FEXT coefficients. The $g_{11}$, $g_{21}$, $g_{12}$, and $g_{22}$ may depend on subcarriers, however, since the same upstream MIMO scheme 400 may be applied to each subcarrier, the subcarrier index k are removed from these parameters in FIG. 4.

During propagation in the upstream channel 410, additive noises, denoted as $U_1\_noise$ and $U_2\_noise$, may be added to the signals $U'_1$ and $U'_2$, which results in signals:

$$U''_1 = U'_1 + U_1\_noise \quad (11)$$

$$U''_2 = U'_2 + U_2\_noise \quad (12)$$

The two signals may be received by the DSLAM, wherein a canceller 420 resides. The canceller 420 is a 2×2 MIMO system configured to generate two output signals, denoted as $U'''_1$ and $U'''_2$, from the two input signals $U''_1$ and $U''_2$ using equations:

$$U'''_1 = c_{11} \times U''_1 + c_{21} \times U''_2 \quad (13)$$

$$U'''_2 = c_{12} \times U''_1 + c_{22} \times U''_2 \quad (14)$$

Since the same upstream MIMO scheme 400 may be applied to each subcarrier, the subcarrier index k are removed in FIG. 4 (i.e., c(i, j, k) is represented by $c_{ij}$ and $U'_j(k)$ represented by $U'_j$).

As show in FIG. 4, there may be two signal paths from the xTU-R1 to the xTU-C1 and two signal paths from the xTU-R2 to the xTU-C1, which is similar to the downstream direction. A first path may be a main signal path from the xTU-R1 to the xTU-C1, a second path a second-order signal path from the xTU-R1 to the xTU-C1, a third path an upstream FEXT path from the xTU-R2 to the xTU-C1, and a fourth path a cancellation path from the xTU-R2 to the xTU-C1, which may be designed to reduce or cancel the upstream FEXT. Four signal paths to the xTU-C2 may be similarly determined.

When upstream FEXT is relatively small, the canceller coefficients may be small, and the second-order signal component from the second path may be negligible. In this case, the canceller coefficients may only need to consider cancelling upstream crosstalk. However, when crosstalk is sufficiently strong, the second-order signal component may become significant (e.g., equal to or greater than signal in the first path). In this case, when a cancellation coefficient (e.g., $c_{21}$) is calibrated to cancel upstream FEXT component for one xTU-C, it may potentially reduce the total level of a signal that is intended for another xTU-C. One skilled in the art would recognize that the aforementioned issues may persist in a general system comprising N subscriber lines.

Disclosed herein are systems and methods for improved MIMO mechanisms in both downstream and upstream directions. The present disclosure may utilize time division multiple access (TDMA) or frequency division multiple access (FDMA) schemes or methods in a frequency band among group of lines to prevent FEXT between subscriber lines, but at the same time use existing precoder/canceller architecture to enhance signals or signal components for each intended receiver. In a downstream direction, precoder coefficients may be configured or trained in a manner analogous to a beamforming technique used in wireless communications. In an upstream direction, canceller coefficients may be configured or trained in a manner analogous to a maximal ratio combining (MRC) technique used in wireless communications. The disclosed schemes may be implemented with no hardware changes to existing vector systems, while enhancing performance even in strong crosstalk environments.

In a vectored group comprising a plurality of subscriber lines, TDMA-MIMO may separate transmission/receiving time by assigning each subscriber line different time slots to carry signals. Since signals may not be simultaneously carried in two or more lines, undesirable FEXT may be effectively eliminated. Similarly, FDMA-MIMO may eliminate undesirable FEXT by separating subcarriers. In the plurality of subcarrier lines, each line may be assigned a specified set of subcarriers, which occupies a different frequency band from any other set of subcarriers. For a DSLAM coupled to a plurality of subscriber lines, any two of the subscriber lines may not have the same subcarrier in the same time slot. Further, FEXT contributing to a second-order signal path may be utilized in a positive way to enhance a magnitude or a SNR of an intended signal.

Figure 5:
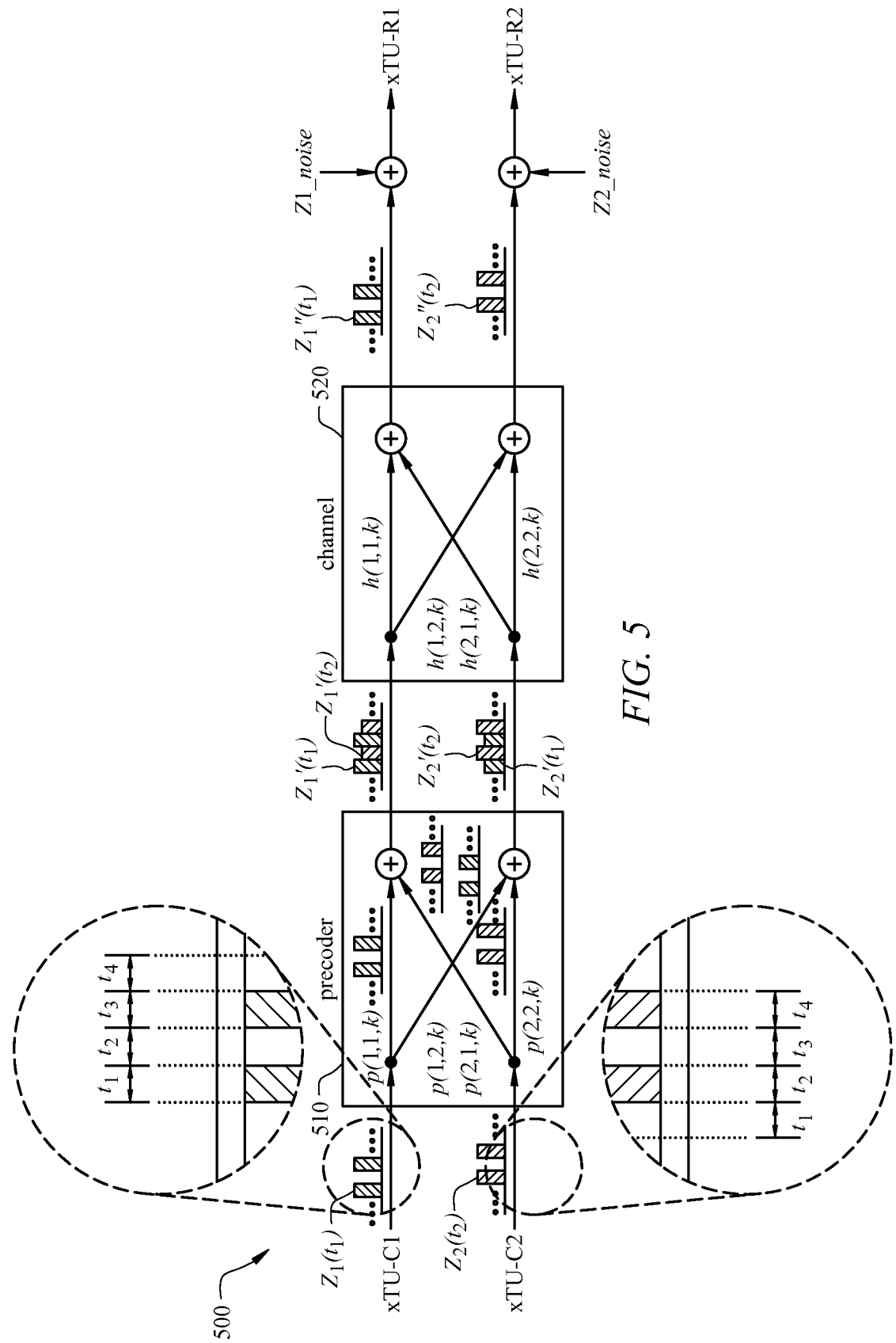
FIG. 5 illustrates an embodiment of a downstream time division multiple access (TDMA)-MIMO scheme.

FIG. 5 illustrates an embodiment of a downstream TDMA-MIMO scheme 500, which may be implemented in a DSL system to enhance downstream signals. In the interest of clarity, an illustrative configuration with two subscriber lines will be described first and followed by description of a general configuration with N subscriber lines. Since some aspects of the TDMA-MIMO may be similar to the MIMO scheme 300, in the interest of conciseness, the discussion focuses mainly on the aspects that are different.

In the downstream TDMA-MIMO scheme 500, each xTU-C may be assigned to transmit in a different time slot, and each xTU-R may only receive at its specified time slots. A duration of each time slot or slice may be no shorter than an orthogonal frequency-division multiplexing (OFDM) symbol. For example, xTU-C1 and xTU-C2 may alternatively transmit signals in different time slots. The xTU-C1 may transmit signals in time slots denoted as $t_1$ and $t_3$, while the xTU-C2 may transmit signals in time slots denoted as $t_2$ and $t_4$, as shown in FIG. 5. All signals may be received and processed by a precoder 510, which is configured to generate two output signals based on two input signals. In this case, two time slots $t_1$ and $t_2$ may be used to illustrate the principles of the TDMA-MIMO scheme. In $t_1$ and $t_2$, signals being fed into the precoder 510 may be denoted as $Z_i(t_j)$, wherein i,j=1, 2. Based on TDMA, we have:

$$Z_1(t_1) \neq 0 \quad (15)$$

$$Z_2(t_1) = 0 \quad (16)$$

$$Z_1(t_2) = 0 \quad (17)$$

$$Z_2(t_2) \neq 0 \quad (18)$$

Based on the two inputs, the precoder 510 may generate four output signals, denoted as $Z'_i(t_j)$, wherein i, j=1, 2, using equations:

$$Z'_1(t_1) = p(1,1,k) \times Z_1(t_1) \quad (19)$$

$$Z'_2(t_1) = p(1,2,k) \times Z_1(t_1) \quad (20)$$

$$Z'_1(t_2) = p(2,1,k) \times Z_2(t_2) \quad (21)$$

$$Z'_2(t_2) = p(2,2,k) \times Z_2(t_2) \quad (22)$$

where each $p(i, j, k)$ refers to a precoder coefficient from input i to output j on subcarrier k. Although signal notations do not include the subcarrier k (since TMDA is signaled by time separation rather than frequency separation), it should be understood that each signal in the equations (19)-(22) correspond to the subcarrier k. Further, each of the inputs in the two time slots may comprise one or more subcarriers. If the inputs contain a plurality of subcarriers, the precoder coefficient on a subcarrier may be applied onto the signal component of the same subcarrier.

After signal processing by the precoder 510, four output signals may be generated corresponding to $t_1$ and $t_2$, which may then be transmitted from a DSLAM, wherein the precoder 510 resides. In a first time slot $t_1$, a first signal $Z'_1(t_1)$ may be transmitted onto Line 1 and a second signal $Z'_2(t_1)$ may be transmitted onto Line 2, wherein the first and second signals may be linearly related and intended for a first CPE (i.e., xTU-R1). In a second time slot $t_2$, a third signal $Z_2(t_2)$ may be transmitted onto Line 2 and a fourth signal $Z'_1(t_2)$ may be transmitted onto Line 1, wherein the third and fourth signals may be linearly related and intended for a second CPE (i.e., xTU-R2). Although the first and second signals, or the third and fourth signals may be linearly related by precoder coefficients, their phases and/or magnitudes may be different.

After propagating in a downstream channel 520, the phase and/or magnitude of the output signals may be further changed. Since each receiver may be configured to receive signals only in its specified or designated time slots, e.g., with xTU-R1 receiving in $t_1$, and xTU-R2 receiving in $t_2$, only signals intended for its corresponding receiver may need to be considered. In other words, a signal denoted as $Z''_1(t_1)$ and intended for xTU-R1, and another signal denoted as $Z''_2(t_2)$ and intended for xTU-R2 may be considered. In an embodiment, the two signals may be generated as follows:

$$Z''_1(t_1) = h(1, 1, k) \times Z'_1(t_1) + h(2, 1, k) \times Z'_2(t_1) \quad (23)$$
$$= h(1, 1, k) \times p(1, 1, k) \times Z_1(t_1) + h(2, 1, k) \times p(1, 2, k) \times Z_1(t_1)$$
$$= [h(1, 1, k) \times p(1, 1, k) + h(2, 1, k) \times p(1, 2, k)] \times Z_1(t_1)$$

$$Z''_2(t_2) = h(1, 2, k) \times Z'_1(t_2) + h(2, 2, k) \times Z'_2(t_2) \quad (24)$$
$$= h(1, 2, k) \times p(2, 1, k) \times Z_2(t_2) + h(2, 2, k) \times p(2, 2, k) \times Z_2(t_2)$$
$$= [h(1, 2, k) \times p(2, 1, k) + h(2, 2, k) \times p(2, 2, k)] \times Z_2(t_2)$$

where $h(1, 1, k)$ and $h(2, 2, k)$ refer to downstream channel transfer functions or gains on subcarrier k, and $h(1, 2, k)$ and $h(2, 1, k)$ refer to downstream FEXT coefficients on subcarrier k. Generally, the transfer gains and FEXT coefficients may be regarded as channel parameters, and their value may be determined via various techniques, such as channel estimation and FEXT training during an initialization stage of a data communication session. If a signal propagating in the downstream channel 520 comprises a plurality of subcarriers, the channel parameter on each subcarrier may be applied onto the signal component on the same subcarrier.

In the downstream TDMA-MIMO scheme 500, there may now be only two signal paths from xTU-Cs to an xTU-R, which is a reduction from the four signal paths in a conventional scheme. For example, in equations (23) and (24), each of the signals $Z''_1(t_1)$ and $Z''_2(t_2)$ may comprise two components, which may also be regarded as separate signals if desired. In the two signal paths from the xTU-C1 to the xTU-R1, a first path corresponding to the term $h(1,1,k) \times p(1,1,k) \times Z_1(t_1)$ in equation (23) may be a main signal path and a second path corresponding to the term $h(2,1,k) \times p(1,2,k) \times Z_1(t_1)$ may be a second-order signal path. Because of TDMA, no signal may be transmitted by the xTU-C2 in time slot $t_1$, thus a downstream FEXT signal path and a precoding signal path may no longer exist. It should be noted that two signal paths from the xTU-C2 to the xTU-R2 may be similarly determined corresponding to the two terms $h(1,2,k) \times p(2,1,k) \times Z_2(t_2)$ and $h(2,2,k) \times p(2,2,k) \times Z_2(t_2)$ in equation (24).

Accordingly, some precoder coefficients may be configured to enhance the second-order signal component instead of reducing downstream FEXT. In an embodiment, the coefficient $p(1, 2, k)$ may be configured such that the phase of the cross product term $h(2,1,k) \times p(1,2,k)$ and the phase of $h(1,1,k) \times p(1,1,k)$ are substantially equal or equivalent. As a result, the second-order signal component $h(2,1,k) \times p(1,2,k) \times Z_1(t_1)$ in equation (23) may line up or add constructively with the main signal component $h(1,1,k) \times p(1,1,k) \times Z_1(t_1)$. According to addition of complex numbers, an overall magnitude of the signal $Z''_1(t_1)$ in equation (23) may be maximized. Furthermore, the magnitude of $p(1, 2, k)$ may have any appropriate value, e.g., smaller than, equaling, or greater than the magnitude of $p(1, 1, k)$.

Similarly, to maximize the signal $Z''_2(t_2)$ in equation (24), the coefficient $p(2, 1, k)$ may be configured such that the phase of $h(1,2,k) \times p(2,1,k)$ substantially equals the phase of $h(2,2,k) \times p(2,2,k)$. As a result, the second-order signal component $h(1,2,k) \times p(2,1,k) \times Z_2(t_2)$ in equation (24) may line up or add constructively with the main signal component $h(2,2,k) \times p(2,2,k) \times Z_2(t_2)$. Furthermore, the magnitude of $p(2, 1, k)$ may have any appropriate value, e.g., smaller than, equaling, or greater than the magnitude of $p(2, 2, k)$.

In the downstream TDMA-MIMO scheme 500, enhancing a second-order signal for one xTU-R may not affect a signal intended for another xTU-R. For example, regardless of how $p(1, 2, k)$ is calibrated to adjust the signal component $h(2,1,k) \times p(1,2,k) \times Z_1(t_1)$ intended for xTU-R1, it may not affect the signal $Z''_2(t_2)$ intended for xTU-R2. The flexibility in configuring the precoder 510 may be advantageous compared to conventional MIMO schemes.

During propagation in the downstream channel 520, additive noises, denoted as $Z_1\_noise$ and $Z_2\_noise$, may be added to the signals $Z''_1(t_1)$ and $Z''_2(t_2)$, which results in signals:

$$Z'''_1(t_1) = Z''_1(t_1) + Z_1\_noise \quad (25)$$

$$Z'''_2(t_2) = Z''_2(t_2) + Z_2\_noise \quad (26)$$

Note that the additive noises may also depend on subcarriers. If different additive noises are added to signals on different subcarriers, each additive noise and its corresponding signal on the same subcarrier may be added. Further, in the TDMA-MIMO scheme 500, any appropriate method may be used to configure the precoder 510 so that a SNR of the signal received by xTU-R1 and xTU-R2 may be maximized.

Although the downstream TDMA-MIMO scheme 500 only includes two subscriber lines, it should be noted that a TDMA-MIMO scheme disclosed herein may be applied to any suitable number of subscriber lines. For the general case of a vectored group comprising a plurality of subscriber lines, the vectored group may or may not be divided into a number of subgroups. For example, sometimes FEXT may not exist or may be small (compared to signal level) between some of the subscriber lines in the vectored group even if these subscriber lines carry signals in the same time slot. In this case, or if a number of the subscriber lines in the vectored group is relatively large, the vectored group may be divided into a number of subgroups, wherein FEXT does not exist or is small between any two subgroups. Within each subgroup, time slots may be assigned or designated independently, and precoder coefficients for each subgroup may be calculated independently to do beamforming. It is possible that a same time slot may be assigned to two or more subgroups, and each subgroup may or may not have an equal number of subscriber lines. Because FEXT between subgroups does not exist or is small, conventional FEXT cancellation techniques may be used across subgroups. For another example, if a number of the subscriber lines in the vectored group is relatively small, or if FEXT may potentially exist between any two subscriber lines in the vectored group, the vectored group may remain as one group, and precoder coefficients may be calculated to do beamforming for each CPE in its corresponding time slots.

In a vectored group containing N subscriber lines or a subgroup containing N subscriber lines, each of N time slots (denoted as $t_1$) may be assigned to one subscriber line, and the subscriber line may carry signal only in its assigned time slot. Each precoder output (denoted as $Z'_i(t_j)$) may be generated based on each precoder input (denoted as $Z_j(t_j)$) as follows:

$$Z'_i(t_j) = p(j,i,k) \times Z_j(t_j)\ i,j=1,2,\ldots,N; k=1,2,\ldots,M \quad (27)$$

After propagating in a downstream channel, only a signal in its assigned time slot and intended for its corresponding CPE may need to be considered. The signal, denoted as $Z''_j(t_j)$, may be computed as:

$$Z''_j(t_j) = \sum_{i=1}^{N} h(i,j,k) \times Z'_i(t_j) \quad j=1,2,\ldots,N; k=1,2,\ldots,M \quad (28)$$

Based on equation (27), we have:

$$Z''_j(t_j) = \sum_{i=1}^{N} h(i,j,k) \times p(j,i,k) \times Z_j(t_j) \quad j=1,2,\ldots,N; k=1,2,\ldots,M \quad (29)$$

In an embodiment, each coefficient p(j, i, k) may be configured such that each term h(i, j, k)×p(j, i, k) may substantially have an equal or comparable phase. Furthermore, the magnitude of each coefficient p(j, i, k) may have any appropriate value.

Figure 6:
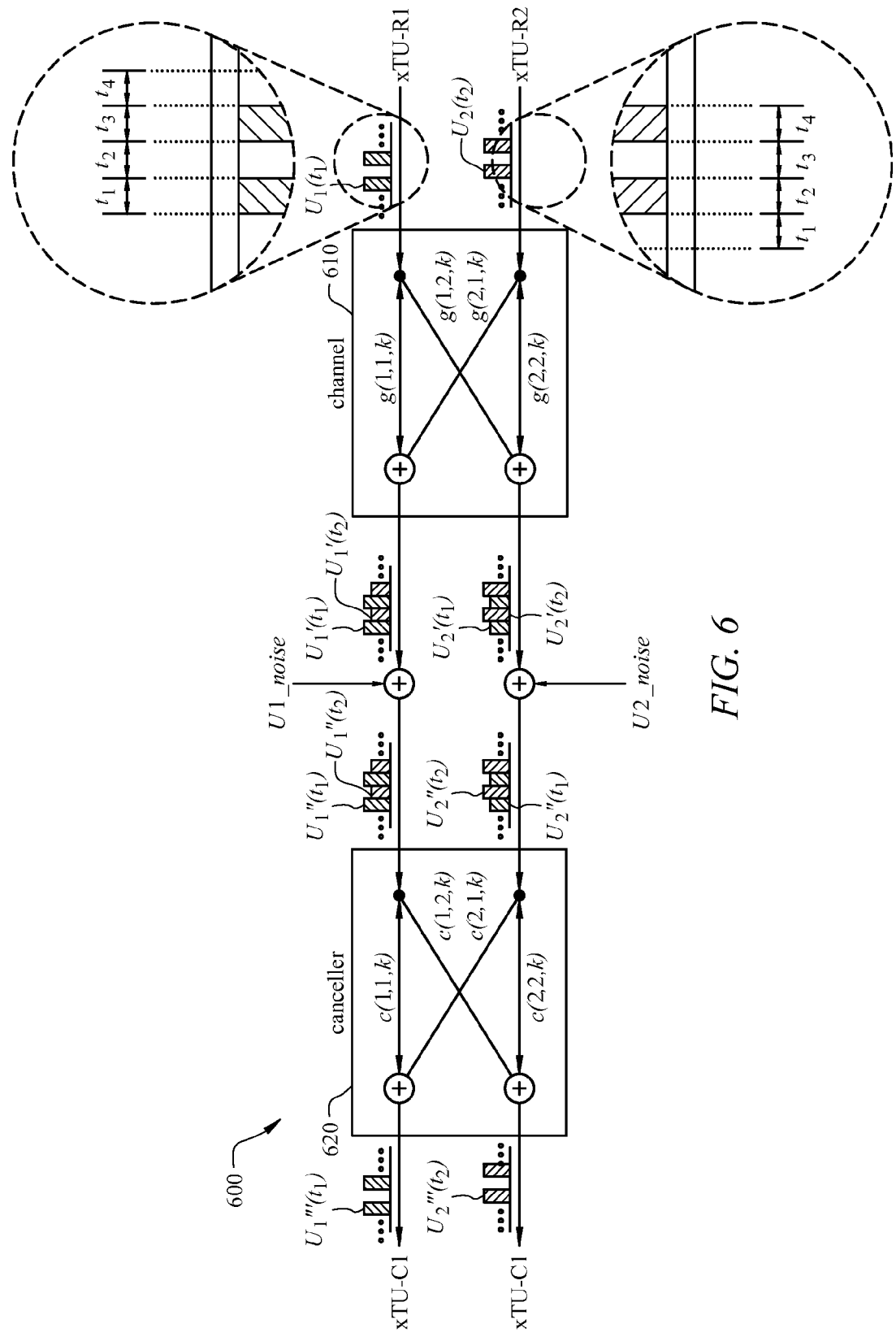
FIG. 6 illustrates an embodiment of an upstream TDMA-MIMO scheme.

FIG. 6 illustrates an embodiment of an upstream TDMA-MIMO scheme 600, which may be implemented in a DSL system to cancel upstream FEXT. Since some aspects of the upstream TDMA-MIMO scheme 600 may be similar to the upstream MIMO scheme 400, the discussion focuses mainly on the aspects that are different in the interest of conciseness. In the upstream TDMA-MIMO scheme 600, each xTU-R may be assigned to transmit in a different time slot, and each xTU-C may only receive at its specified time slots. For example, xTU-R1 and xTU-R2 may alternatively transmit signals in different time slots. The xTU-R1 may transmit signals in time slots denoted as $t_1$ and $t_3$, while the xTU-R2 may transmit signals in time slots denoted as $t_2$ and $t_4$, as shown in FIG. 6.

Two time slots $t_1$ and $t_2$ may be used to illustrate the principles of the upstream TDMA-MIMO scheme 600. In $t_1$ and $t_2$, two signals (denoted as $U_i(t_j)$, wherein i, j=1, 2) may be transmitted by the xTU-R1 and xTU-R2 respectively. Based on TDMA, we have:

$$U_1(t_1) \neq 0 \quad (30)$$

$$U_2(t_1) = 0 \quad (31)$$

$$U_1(t_2) = 0 \quad (32)$$

$$U_2(t_2) \neq 0 \quad (33)$$

The two signals may propagate through an upstream channel 610, after which the phase and/or magnitude of the two signals may be changed. In an embodiment, new signals after propagation, denoted as $U'_i(t_j)$, wherein i, j=1, 2, may be computed or estimated following equations:

$$U'_1(t_1) = g(1,1,k) \times U_1(t_1) \quad (34)$$

$$U'_2(t_1) = g(1,2,k) \times U_1(t_1) \quad (35)$$

$$U'_1(t_2) = g(2,1,k) \times U_2(t_2) \quad (36)$$

$$U'_2(t_2) = g(2,2,k) \times U_2(t_2) \quad (37)$$

where g(1, 1, k) and g(2, 2, k) refer to upstream channel transfer functions or gains on subcarrier k, and g(1, 2, k) and g(2, 1, k) refer to upstream FEXT coefficients on subcarrier k. Generally, the upstream transfer gains and upstream FEXT coefficients may be regarded as upstream channel parameters, and their value may be determined or estimated via various techniques, such as channel estimation and FEXT training during an initialization stage of a data communication session. If a signal propagating in the upstream channel 610 comprises a plurality of subcarriers, the channel parameter on each subcarrier may be applied onto the signal component on the same subcarrier.

In addition, additive noises, denoted as $U_i(t_j)\_noise$, wherein i,j=1, 2, may be added to each signal $U'_i(t_j)$, which results in signals:

$$U''_1(t_1) = U'_1(t_1) + U_1(t_1)\_noise \quad (38)$$

$$U''_2(t_1) = U'_2(t_1) + U_2(t_1)\_noise \quad (39)$$

$$U''_1(t_2) = U'_1(t_2) + U_1(t_2)\_noise \quad (40)$$

$$U''_2(t_2) = U'_2(t_2) + U_2(t_2)\_noise \quad (41)$$

The four noise-corrupted signals may be received in time slots $t_1$ and $t_2$ by a DSLAM, wherein a canceller 620 resides. Since each receiver in the DSLAM may be configured to receive signals only in its designated time slots, e.g., with xTU-C1 receiving in $t_1$, and xTU-C2 receiving in $t_2$, only signals intended for its corresponding receiver may need to be considered. In other words, a signal denoted as $U'''_1(4)$ and intended for xTU-C1, and another signal denoted as $U'''_2(t_2)$ and intended for xTU-C2 may be considered. The canceller 620 is a 2×2 MIMO system configured to generate two output signals from the two input signals in each time slot. In an embodiment, $U'''_1(t_1)$ and $U'''_2(t_2)$ are computed using equations:

$$U'''_1(t_1) = c(1,1,k) \times U''_1(t_1) + c(2,1,k) \times U''_2(t_1) \quad (42)$$

$$U'''_2(t_2) = c(1,2,k) \times U''_1(t_2) + c(2,2,k) \times U''_2(t_2) \quad (43)$$

where each c(i, j, k) refers to a precoder coefficient from input i to output j on subcarrier k. It should be noted that the signals in the two time slots may or may not be on the same subcarriers. If the inputs contain a plurality of subcarriers, the canceller coefficient on a subcarrier may be applied onto the signal component of the same subcarrier.

In the TDMA-MIMO scheme 600, there may now be only two signal paths from xTU-Rs to an xTU-C, which is a reduction from the four signal paths in a conventional scheme. For example, in equations (42) and (43), each of the signals $U'''_1(4)$ and $U'''_2(t_2)$ may comprise two components, which may also be regarded as separate signals if desired. In the two signal paths from the xTU-R1 to the xTU-C1, a first path corresponding to the term $c(1,1,k) \times U''_1(t_1)$ in equation (42) may be a main signal path and a second path corresponding to the term $c(2,1,k) \times U''_2(t_1)$ may be a second-order signal path. Because of TDMA, no signal may be transmitted by the xTU-R2 in time slot $t_1$, thus an upstream FEXT signal path and a cancelling signal path may no longer exist. It should be noted that two signal paths from the xTU-R2 to the xTU-C2 may be similarly determined corresponding to the two terms $c(1,2,k) \times U''_1(t_2)$ and $c(2,2,k) \times U''_2(t_2)$ in equation (43).

Since the canceller input signals may already contain noise components, the canceller coefficients may not be designed to maximize the input signals themselves. For example, if the noise component on Line 1 is significant, it may not be desirable to maximize the input signal from Line 1. Rather, the canceller coefficients may be configured to maximize SNRs of the canceller output signals $U'''_1(t_1)$ and $U'''_2(t_2)$. In an embodiment, configuration of the canceller coefficients may comprise MRC, which takes account of the magnitudes and phases of noise components in order to maximize SNR. For example, $c(1, 1, k)$ and $c(2, 1, k)$ may be chosen to do MRC for xTU-C1 in time slot $t_1$, and $c(1, 2, k)$ and $c(2, 2, k)$ may be chosen to do MRC for xTU-C2 in time slot $t_2$. Any other algorithm may also be used to maximize SNRs of the intended canceller output signals.

Although the upstream TDMA-MIMO scheme 600 only shows two subscriber lines, it should be noted that an upstream TDMA-MIMO scheme disclosed herein may be applied to any suitable number of subscriber lines. For the general case of a vectored group comprising a plurality of subscriber lines, the vectored group may or may not be divided into a number of subgroups. For example, sometimes FEXT may not exist or may be small (compared to signal level) between some of the subscriber lines in the vectored group even if these subscriber lines carry signals in the same time slot. In this case, or if a number of the subscriber lines in the vectored group is relatively large, the vectored group may be divided into a number of subgroups, wherein FEXT does not exist or is small between any two subgroups. Within each subgroup, time slots may be assigned or designated independently, and canceller coefficients for each subgroup may be calculated independently to do MRC. It is possible that a same time slot may be assigned to two or more subgroups, and each subgroup may or may not have an equal number of subscriber lines. Because the FEXT between subgroups may not exist or is small, conventional canceller may be used across subgroups. For another example, if a number of the subscriber lines in the vectored group is relatively small, or if FEXT may potentially exist between any two subscriber lines in the vectored group, the vectored group may remain as one group, and canceller coefficients may be calculated to do MRC for each xTU-C in its corresponding time slots.

Figure 7:
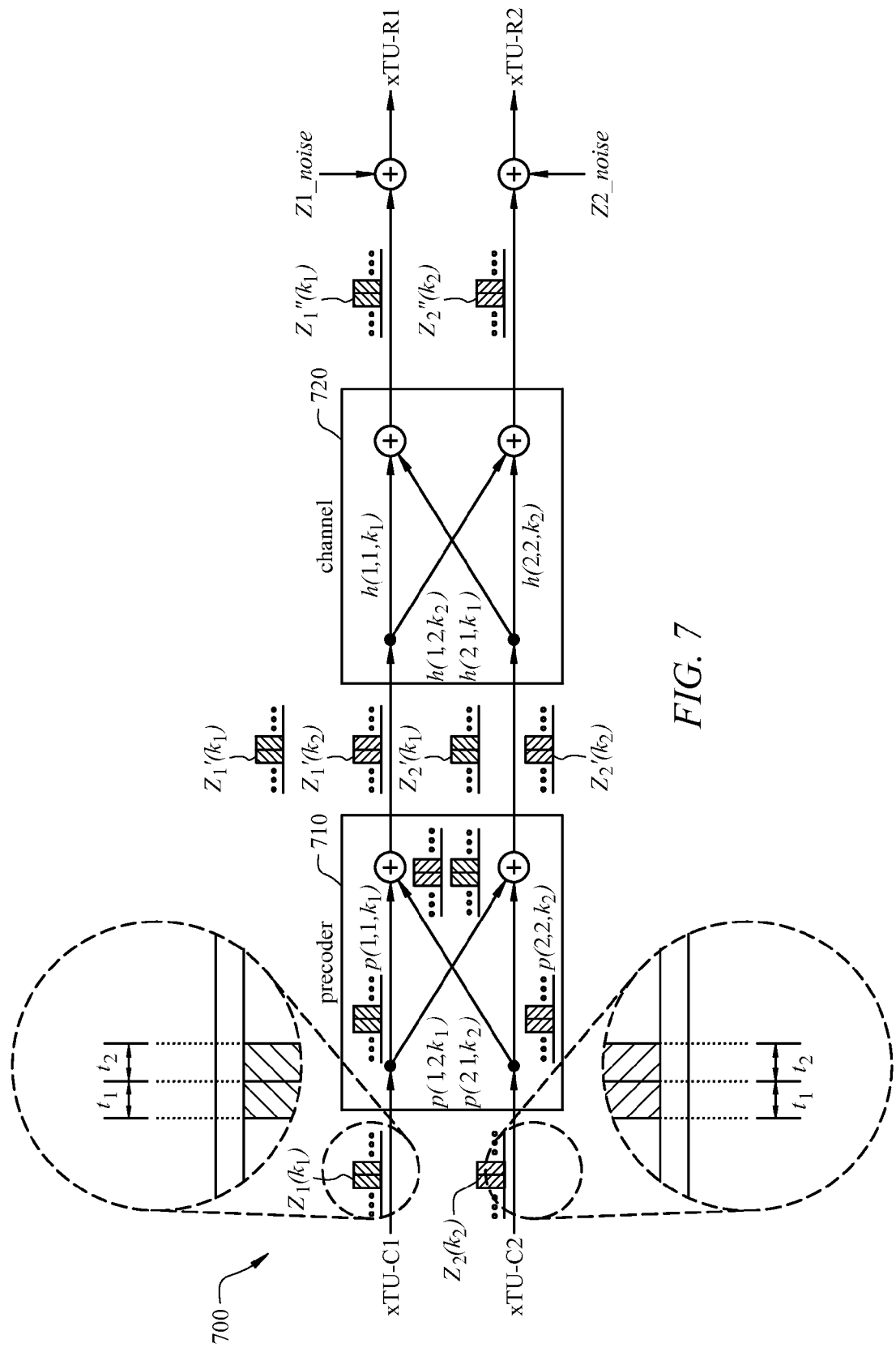
FIG. 7 illustrates an embodiment of a downstream frequency division multiple access (FDMA)-MIMO scheme.

The TMDA-MIMO schemes described above may be extended to FDMA-MIMO schemes, which prevents FEXT using frequency separation instead of time separation. FIG. 7 illustrates an embodiment of a downstream FDMA-MIMO scheme 700, which may be implemented in a DSL system to cancel FEXT in the downstream channel. Since some aspects of the FDMA-MIMO scheme 700 may be similar to the MIMO scheme 300, in the interest of conciseness, the discussion focuses mainly on the aspects that are different. In the downstream FDMA-MIMO scheme 700, each xTU-C may be assigned to transmit signals that are modulated on a different set of subcarriers, and each xTU-R may only receive signals corresponding to its assigned set of subcarriers. For example, in a time slot, xTU-C1 and xTU-C2 may simultaneously transmit two signals, each of which comprises signal components on different subcarriers. In time slots $t_1$ and $t_2$, the xTU-C1 may transmit signal components on subcarriers denoted as $k_1$ and $k_3$, while the xTU-C2 may transmit signals on subcarriers denoted as $k_2$ and $k_4$, as shown in FIG. 7, wherein either $k_1$ or $k_3$ does not equal $k_2$ or $k_4$.

All signals may be received and processed by a precoder 710, which is configured to generate two output signals based on two input signals for each subcarrier. In this case, two subcarriers $k_1$ and $k_2$ transmitted in time slot $t_1$ may be used as an example to illustrate the principles of the FDMA-MIMO scheme. Based on FDMA, in $t_1$ we have signal components:

$$Z_1(k_1) \neq 0 \tag{44}$$

$$Z_2(k_1) = 0 \tag{45}$$

$$Z_1(k_2) = 0 \tag{46}$$

$$Z_2(k_2) \neq 0 \tag{47}$$

Based on the two non-zero input signal components in $t_1$, the precoder 710 may generate four non-zero output signal components, denoted as $Z'_i(k_j)$, wherein i, j=1, 2, using equations:

$$Z'_1(k_1) = p(1,1,k_1) \times Z_1(k_1) \tag{48}$$

$$Z'_1(k_2) = p(2,1,k_2) \times Z_2(k_2) \tag{49}$$

$$Z'_2(k_1) = p(1,2,k_1) \times Z_1(k_1) \tag{50}$$

$$Z'_2(k_2) = p(2,2,k_2) \times Z_2(k_2) \tag{51}$$

It should be understood that each input signal in the time slot $t_1$ may comprise two or more components corresponding to two or more subcarriers, in which case each signal component may be computed independently.

After signal processing by the precoder 710, two output signals, each comprising two signal components, may be transmitted in time slot $t_1$ from a DSLAM, wherein the precoder 710 resides. In an embodiment, a first signal may be transmitted onto Line 1 and a second signal may be transmitted onto Line 2. A first component of the first signal (i.e., $Z'_1(k_1)$) and a first component of the second signal (i.e., $Z'_2(k_1)$) may be linearly related and intended for a first CPE (i.e., xTU-R1). A second component of the first signal (i.e., $Z'_1(k_2)$) and a second component of the second signal (i.e., $Z'_2(k_2)$) may be linearly related and intended for a second CPE (i.e., xTU-R2). It should be noted that the first component of the first signal and the first component of the second signal may comprise a first set of subcarriers, and the second component of the first signal and the second component of the second signal may comprise a second set of subcarriers, wherein the first and second sets of subcarriers occupy different frequency bands. Note that subcarriers within each set described herein may or may not be consecutive subcarriers.

After propagating in a downstream channel 720, the phase and/or magnitude of the output signals may be further changed. Since each receiver may be configured to receive signals only in its specified set of subcarriers, e.g., with xTU-R1 receiving signal component comprising subcarrier $k_1$ and xTU-R2 receiving signal component comprising subcarrier $k_2$, only signal components intended for its corresponding receiver may need to be considered. In other words, a signal denoted as $Z''_1(k_1)$ and intended for xTU-R1, and another signal denoted as $Z''_2(k_2)$ and intended for xTU-R2 may be considered. In an embodiment, the two signals may be generated as follows:

$$Z''_1(k_1) = h(1, 1, k_1) \times Z'_1(k_1) + h(2, 1, k_1) \times Z'_2(k_1) \quad (52)$$
$$= h(1, 1, k_1) \times p(1, 1, k_1) \times Z_1(k_1) +$$
$$h(2, 1, k_1) \times p(1, 2, k_1) \times Z_1(k_1)$$
$$= [h(1, 1, k_1) \times p(1, 1, k_1) + h(2, 1, k_1) \times p(1, 2, k_1)] \times Z_1(k_1)$$

$$Z''_2(k_2) = h(1, 2, k_2) \times Z'_1(k_2) + h(2, 2, k_2) \times Z'_2(k_2) \quad (53)$$
$$= h(1, 2, k_2) \times p(2, 1, k_2) \times Z_2(k_2) +$$
$$h(2, 2, k_2) \times p(2, 2, k_2) \times Z_2(k_2)$$
$$= [h(1, 2, k_2) \times p(2, 1, k_2) + h(2, 2, k_2) \times p(2, 2, k_2)] \times Z_2(k_2)$$

where $h(1,1,k_1)$ denotes a downstream channel transfer function on subcarrier $k_1$, $h(2,2,k_2)$ denotes a downstream channel transfer function on subcarrier $k_2$, $h(1,2,k_2)$ denotes a downstream FEXT coefficient on subcarrier $k_2$, and $h(2,1,k_1)$ denotes a downstream FEXT coefficient on subcarrier $k_1$. Generally, the downstream transfer gains and downstream FEXT coefficients may be regarded as channel parameters, and their value may be determined via various techniques, such as channel estimation and FEXT training during an initialization stage of a data communication session.

In the downstream FDMA-MIMO scheme 700, there may be only two signal paths from xTU-Cs to an xTU-R, which is a reduction from the four signal paths in a conventional scheme. For example, in equations (52) and (53), each of the signals $Z''_1(k_1)$ and $Z''_2(k_2)$ may comprise two components. In the two signal paths from the xTU-C1 to the xTU-R1, a first path corresponding to the term $h(1,1,k_1) \times p(1,1,k_1) \times Z_1(k_1)$ in equation (52) may be a main signal path and a second path corresponding to the term $h(2,1,k_1) \times p(1,2,k_1) \times Z_1(k_1)$ may be a second-order signal path. Because of FDMA, no signal component on subcarrier $k_1$ may be transmitted by the xTU-C2, thus a downstream FEXT signal path and a precoding signal path may no longer exist. It should be noted that two signal paths from the xTU-C2 to the xTU-R2 may be similarly determined corresponding to the two terms $h(1,2,k_2) \times p(2,1,k_2) \times Z_2(k_2)$ and $h(2,2,k_2) \times p(2,2,k_2) \times Z_2(k_2)$ in equation (53).

Accordingly, some precoder coefficients may be configured to enhance the second-order signal component instead of reducing FEXT. In an embodiment, the coefficient $p(1,2,k_1)$ is determined such that a phase of $h(2,1,k_1) \times p(1,2,k_1)$ and a phase of $h(1,1,k_1) \times p(1,1,k_1)$ are substantially equivalent, and $p(2,1,k_2)$ is determined such that a phase of $h(1,2,k_2) \times p(2,1,k_2)$ and a phase of $h(2,2,k_2) \times p(2,2,k_2)$ are substantially equivalent. As a result, the second-order signal components in equations (52) and (53) may line up or add constructively with their corresponding main signal components. Accordingly, magnitudes of the signals $Z''_1(k_1)$ and $Z''_2(k_2)$ may be maximized. Furthermore, the magnitudes of $p(1,2,k_1)$ and $p(2,1,k_2)$ may have any appropriate value. For example, a magnitude of $p(1,2,k_1)$ may be no greater than a magnitude of $p(1,1,k_1)$, and a magnitude of $p(2,1,k_2)$ may be no greater than a magnitude of $p(2,2,k_2)$.

In the downstream FDMA-MIMO scheme 700, enhancing a second-order signal for one xTU-R may not affect a signal intended for another xTU-R. For example, regardless of how $p(1,2,k_1)$ is calibrated to adjust the signal component $h(2,1,k_1) \times p(1,2,k_1) \times Z_1(k_1)$ intended for xTU-R1, it may not affect the signal $Z''_2(k_2)$ intended for xTU-R2. The flexibility in configuring the precoder 710 may be advantageous compared to conventional MIMO schemes.

During propagation in the downstream channel 720, additive noises, denoted as $Z_1\_noise$ and $Z_2\_noise$, may be added to the signals $Z''_1(k_1)$ and $Z''_2(k_2)$, which results in signals:

$$Z'''_1(k_1) = Z''_1(k_1) + Z_1\_noise \quad (54)$$

$$Z'''_2(k_2) = Z''_2(k_2) + Z_2\_noise \quad (55)$$

Note that the additive noises may also depend on subcarriers. If different additive noises are added to signals on different subcarriers, each additive noise and its corresponding signal on the same subcarrier may be added. Further, in the downstream FDMA-MIMO scheme 700, any appropriate method may be used to configure the precoder 710 so that a signal-to-noise ratio (SNR) of the signal received by xTU-R1 and xTU-R2 may be maximized.

Although the downstream FDMA-MIMO scheme 700 only shows two subscriber lines, it should be noted that a FDMA-MIMO scheme disclosed herein may be applied to any suitable number of subscriber lines. For the general case of a vectored group comprising a plurality of subscriber lines, the vectored group may or may not be divided into a number of subgroups. For example, sometimes FEXT may not exist or may be small (compared to signal level) between some of the subscriber lines in the vectored group even if these subscriber lines carry signals on the same set of subcarriers. In this case, or if a number of the subscriber lines in the vectored group is relatively large, the vectored group may be divided into a number of subgroups, wherein FEXT does not exist or is small between any two subgroups. Within each subgroup, subcarriers may be assigned or designated independently, and precoder coefficients for each subgroup may be calculated independently to do beamforming. It is possible that a same set of subcarriers may be assigned to two or more subgroups, and each subgroup may or may not have an equal number of subscriber lines. Because the FEXT between subgroups may not exist or is small, conventional precoder may be used across subgroups. For another example, if a number of the subscriber lines in the vectored group is relatively small, or if FEXT may potentially exist between any two subscriber lines in the vectored group, the vectored group may remain as one group, and precoder coefficients may be calculated to do beamforming for each CPE in its corresponding subcarriers.

In a vectored group containing N subscriber lines or a subgroup containing N subscriber lines, each of N sets of subcarriers may be assigned to one subscriber line, and the subscriber line may carry signal only in its assigned set of subcarriers. Each precoder output (denoted as $Z'_i(k_j)$) may be generated based on each precoder input (denoted as $Z_j(k_j)$) by the following equation, wherein k denotes a subcarrier k in the j-th set of subcarriers:

$$Z'_i(k_j) = p(j,i,k_j) \times Z_j(k_j) \; i,j=1,2,\ldots,N \quad (56)$$

After propagating in a downstream channel, only a signal in its assigned set of subcarriers and intended for its corresponding CPE may need to be considered. The signal, denoted as $Z''_j(k_j)$, may be computed by the following equation, wherein k denotes a subcarrier k in the j-th set of subcarriers:

$$Z''_j(k_j) = \sum_{i=1}^{N} h(i, j, k_j) \times Z'_i(k_j) \quad j = 1, 2, \ldots, N \quad (57)$$

Based on equation (56) we have:

$$Z''_j(k_j) = \sum_{i=1}^{N} h(i, j, k_j) \times p(j, i, k_j) \times Z_j(k_j) \quad j = 1, 2, \ldots, N \quad (58)$$

In an embodiment, each coefficient $p(j, i, k_j)$ may be configured such that each term $h(i, j, k_j) \times p(j, i, k_j)$ may substantially have an equal or equivalent phase. Furthermore, the magnitude of each coefficient $p(j, i, k_j)$ may have any appropriate value.

Figure 8:
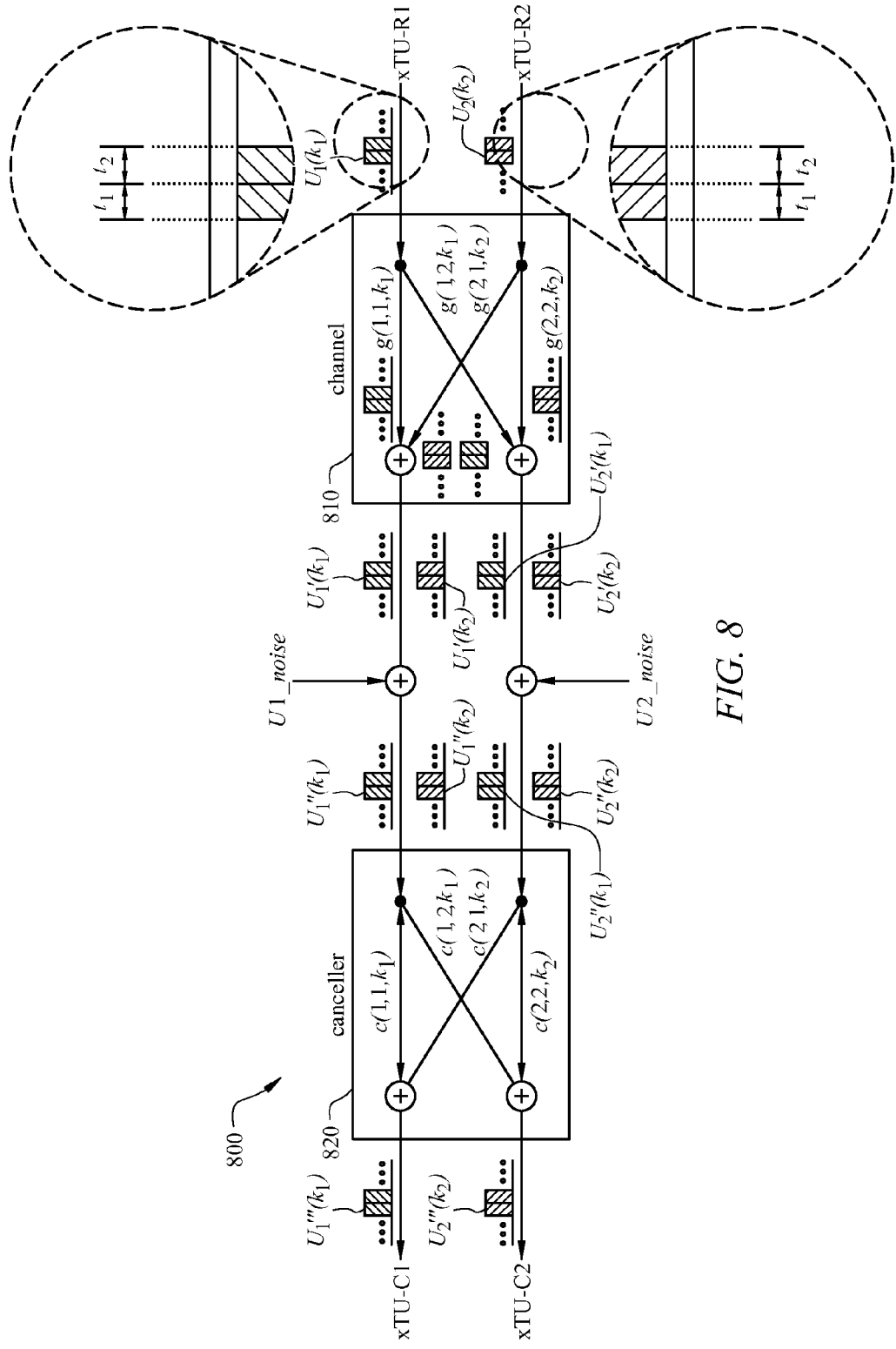
FIG. 8 illustrates an embodiment of an upstream FDMA-MIMO scheme.

FIG. 8 illustrates an embodiment of an upstream FDMA-MIMO scheme 800, which may be implemented in a DSL system to enhance upstream signals by utilizing FEXT. Since some aspects of the upstream FDMA-MIMO scheme 800 may be similar to the upstream MIMO scheme 400, the discussion focuses mainly on the aspects that are different in the interest of conciseness. In the upstream FDMA-MIMO scheme 800, each xTU-R may be assigned to transmit using a different set of subcarriers, and each xTU-C may only receive signals corresponding to its specified set of subcarriers. For example, xTU-R1 may transmit signals on subcarriers denoted as $k_1$ and $k_3$, while xTU-R2 may transmit signals on subcarriers denoted as $k_2$ and $k_4$, as shown in FIG. 8.

Two subcarriers $k_1$ and $k_2$ used in time slot $t_1$ may be used to illustrate the principles of the upstream FDMA-MIMO scheme 800. Two signals (denoted as $U_i(k_j)$, wherein i, j=1, 2) may be transmitted by the xTU-R1 and xTU-R2 respectively. Based on FDMA, we have:

$$U_1(k_1) \neq 0 \tag{59}$$

$$U_2(k_1) = 0 \tag{60}$$

$$U_1(k_2) = 0 \tag{61}$$

$$U_2(k_2) \neq 0 \tag{62}$$

After propagating in an upstream channel 810, the phase and/or magnitude of the two signals may be changed. In an embodiment, new signals after propagation, denoted as $U'_i(k_j)$, wherein i, j=1, 2, may be computed or estimated as follows:

$$U'_1(k_1) = g(1,1,k_1) \times U_1(k_1) \tag{63}$$

$$U'_2(k_1) = g(1,2,k_1) \times U_1(k_1) \tag{64}$$

$$U'_1(k_2) = g(2,1,k_2) \times U_2(k_2) \tag{65}$$

$$U'_2(k_2) = g(2,2,k_1) \times U_2(k_2) \tag{66}$$

where $g(1, 1, k_1)$ denotes an upstream channel transfer function on subcarrier $k_1$, $g(2, 2, k_2)$ denotes an upstream channel transfer function on subcarrier $k_2$, $g(1, 2, k_1)$ denotes an upstream FEXT coefficient on subcarrier $k_1$, and $g(2, 1, k_2)$ denotes an upstream FEXT coefficient on subcarrier $k_2$.

In addition, additive noises, denoted as $U_i(k_j)\_noise$, wherein i,j=1, 2, may be added to each signal $U'_i(k_j)$, which results in signals:

$$U''_1(k_1) = U'_1(k_1) + U_1(k_1)\_noise \tag{67}$$

$$U''_2(k_1) = U'_2(k_1) + U_2(k_1)\_noise \tag{68}$$

$$U''_1(k_2) = U'_1(k_2) + U_1(k_2)\_noise \tag{69}$$

$$U''_2(k_2) = U'_2(k_2) + U_2(k_2)\_noise \tag{70}$$

The four noise-corrupted signals may be received in time slot $t_1$ by a DSLAM, wherein a canceller 820 resides. Since each receiver in the DSLAM may be configured to receive signals only in its designated set of subcarriers, e.g., with xTU-C1 receiving signal component comprising subcarrier $k_1$ and xTU-C2 receiving signal component comprising subcarrier $k_2$, only signal components intended for its corresponding receiver may need to be considered. In other words, a signal denoted as $U'''_1(k_1)$ and intended for xTU-C1, and another signal denoted as $U'''_2(k_2)$ and intended for xTU-C2 may be considered. The canceller 820 is a 2×2 MIMO system configured to generate two output signals from the two input signals (comprising four components) on each set of subcarriers. In an embodiment, $U'''_1(k_1)$ and $U'''_2(k_2)$ are computed using equations:

$$U'''_1(k_1) = c(1,1,k_1) \times U''_1(k_1) + c(2,1,k_1) \times U''_2(k_1) \tag{71}$$

$$U'''_2(k_2) = c(1,2,k_2) \times U''_1(k_2) + c(2,2,k_2) \times U''_2(k_2) \tag{72}$$

In the upstream FDMA-MIMO scheme 800, there may now be only two signal paths from xTU-Rs to an xTU-C, which is a reduction from the four signal paths in a conventional scheme. For example, in equations (71) and (72), each of the signals $U'''_1(k_1)$ and $U'''_2(k_2)$ may comprise two components. In the two signal paths from the xTU-R1 to the xTU-C1, a first path corresponding to the term $c(1,1,k_1) \times U''_1(k_1)$ in equation (71) may be a main signal path and a second path corresponding to the term $c(2,1,k_1) \times U''_2(k_1)$ may be a second-order signal path. Two signal paths from the xTU-R2 to the xTU-C2 may be similarly determined corresponding to the two terms $c(1,2,k_2) \times U''_1(k_2)$ and $c(2,2,k_2) \times U''_2(k_2)$ in equation (72).

Since input signals to the canceller 820 may already contain noise components, the canceller coefficients may not be designed to maximize the input signals themselves. For example, if the noise component on Line 1 is significant, it may not be desirable to maximize the input signal from Line 1. Rather, the canceller coefficients may be configured to maximize SNRs of the canceller output signals $U'''_1(k_1)$ and $U'''_2(k_2)$. In an embodiment, configuration of the canceller coefficients may comprise MRC, which takes account of the magnitudes and phases of noise components in order to maximize SNR. For example, $c(1, 1, k_1)$ and $c(2, 1, k_1)$ may be chosen to do MRC for xTU-C1 on subcarrier $k_1$, and $c(1, 2, k_2)$ and $c(2, 2, k_2)$ may be chosen to do MRC for xTU-C2 on subcarrier $k_2$. Any other algorithm may also be used to maximize SNRs of the intended canceller output signals.

Although the upstream FDMA-MIMO scheme 800 only shows two subscriber lines, it should be noted that an upstream FDMA-MIMO scheme disclosed herein may be applied to any suitable number of subscriber lines. For the general case of a vectored group comprising a plurality of subscriber lines, the vectored group may or may not be divided into a number of subgroups. For example, sometimes FEXT may not exist or may be small (compared to signal level) between some of the subscriber lines in the vectored group even if these subscriber lines carry signals on the same set of subcarriers. In this case, or if a number of the subscriber lines in the vectored group is relatively large, the vectored group may be divided into a number of subgroups, wherein FEXT does not exist or is small between any two subgroups. Within each subgroup, subcarriers may be assigned or designated independently, and canceller coefficients for each subgroup may be calculated independently to do MRC. It is possible that a same set of subcarriers may be assigned to two or more subgroups, and each subgroup may or may not have an equal number of subscriber lines. Because the FEXT between subgroups may not exist or may be small, conventional canceller may be used across subgroups. For another example, if a number of the subscriber lines in the vectored group is relatively small, or if FEXT may potentially exist between any two subscriber lines in the vectored group, the vectored group may remain as one group, and canceller coefficients may be calculated to do MRC for each xTU-C in its corresponding set of subcarriers.

As shown and described above, TDMA or FDMA may be used to realize a MIMO scheme. To incorporate TDMA-MIMO, existing standards may need to be changed, as both an xTU-C and an xTU-R coupled by a subscriber line may need to be aware that a TDMA-MIMO scheme is being used. Thus, messages may be exchanged between both ends before TDMA-MIMO is used.

Compared with TDMA-MIMO, FDMA-MIMO schemes may be used in DSL systems without changing a standard. For example, in the downstream direction, transmitters in a DSLAM may adjust a PSD mask during training to automatically assign subcarriers for each line. Such adjustments may be performed in the DSLAM through firmware, which is a system level software. Thus, there may be no need to change any hardware in the DSLAM or change any hardware/software in CPEs. In the downstream direction, the DSLAM may also influence subcarrier assignment for each line through a bit-loading table. Even though the bit-loading table is sent by an xTU-R in the downstream direction, the DSLAM may skip or disable certain tones or subscribers when sending a training sequence. The xTU-R may regard the skipped subscribers as results of significant noise or attenuation, thus may not assign any bits to subcarriers skipped by the DSLAM.

For another example, in the upstream direction, receivers in the DSLAM may use each line's bit-loading table to automatically assign subcarriers for each line. In implementation, a receiver may decide how many bits to load on or assign to each subcarrier, e.g., by measuring the SNR of a training sequence transmitted by a CPE transmitter and determining how many bits to assign to a particular subcarrier in the bit-loading table. Since DSLAM has information of all subscriber lines, if desired, it may decide to skip some subcarriers for a certain line, even though SNR for that line may be good. After determining subcarrier assignment, the DSLAM may send the bit-loading table back to CPE transmitter. Then, the CPE may transmit data according to the bit-loading table.

Figure 9:
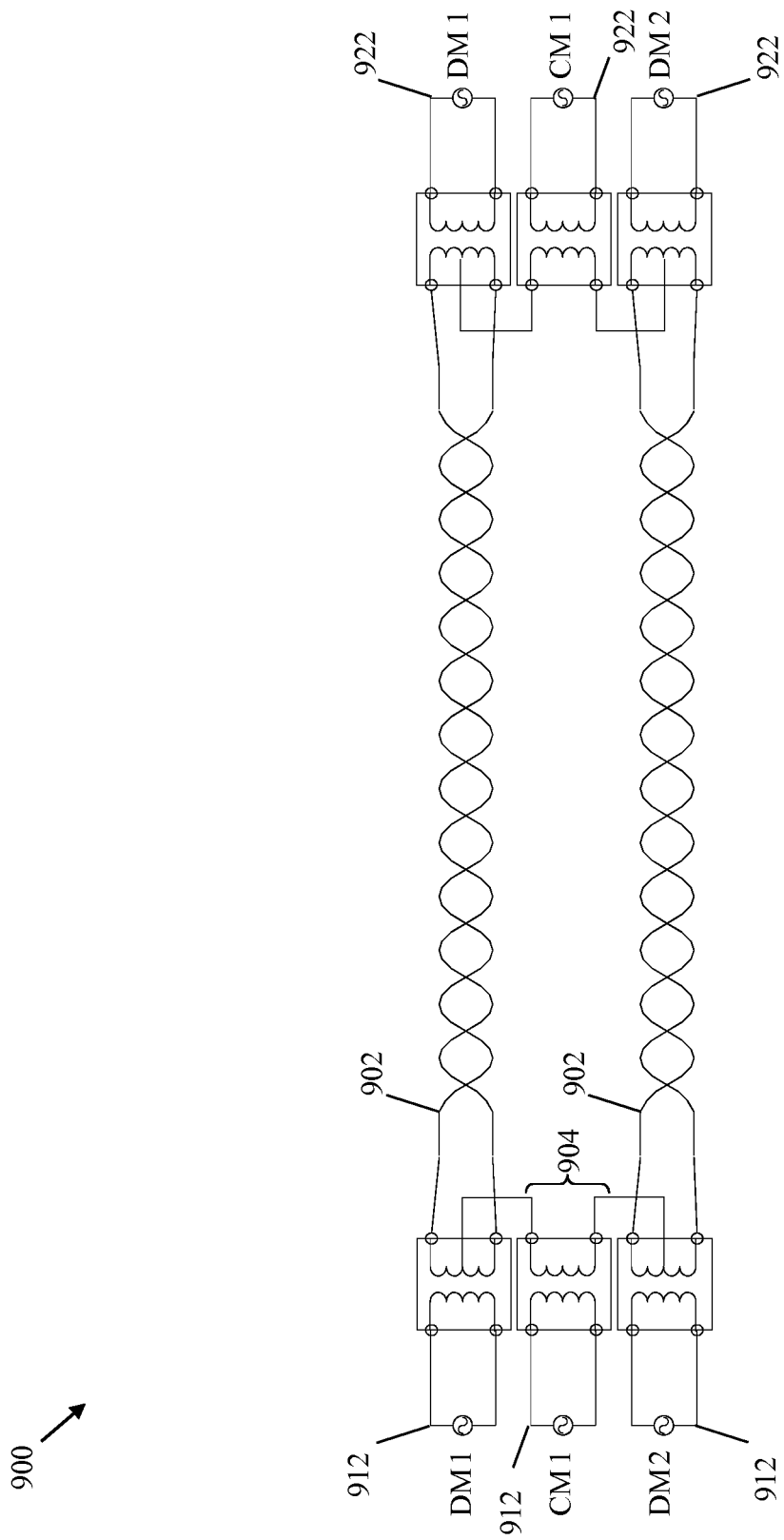
FIG. 9 illustrates an embodiment of a SuperMIMO system.

Some residential sites may have two or more copper pairs connected to a CO or distribution center. FIG. 9 illustrates an embodiment of a configuration 900, sometimes referred to as "SuperMIMO", in which a disclosed TDMA-MIMO or FDMA-MIMO scheme may be implemented. The SuperMIMO system 900 may correspond to a user on the end of a CPE. On another end, a DSLAM may have multiple ports coupled to multiple copper pairs for multiple users, wherein the multiple copper pairs form a vectored group. A "phantom mode" or "SuperMIMO mode" may be implemented in the SuperMIMO system 900, where, in addition to the regular physical copper pairs, virtual pairs may be generated from multiple twisted-pairs using common mode or other technologies. As such, in some embodiments, the total number of channels may be increased from original N physical pairs to up to 2N−1 pairs, which may about double the data rate.

For the purpose of illustration, suppose there are three parallel transceivers 912 that may be coupled to three corresponding parallel transceivers 922 via two physical copper pairs 902 and one virtual pair 904. The physical pairs 902 may be established using a differential mode (DM) in each of the physical pairs 902 (e.g., DM1 and DM2), and the virtual pair 904 may be established according to a SuperMIMO technique, e.g., combining a common mode (CM) of one of the physical pairs 902 and a CM of the other physical pair 902. Thus, the transceivers 912 may communicate with the transceivers 922 via two physical channels that correspond to the physical pairs 902 and one virtual channel that corresponds to the virtual pair 904.

Although FIG. 9 shows only two physical pairs, in practice there may be N physical copper pairs, where N is an integer. In this case, the transceivers on the two ends of the N physical pairs may be coupled by up to 2N−1 corresponding pairs. The 2N−1 pairs may include N physical pairs and up to N−1 virtual pairs. Each virtual pair may be obtained by combining two of the physical wires other than the regular physical pair, or two common mode wires from two other physical or virtual pairs, or using other techniques, to substantially increase the number of channels between the transceivers and thus the total data rate between the transceivers by a factor of up to about (2N−1)/N. The physical copper wires may be combined to form the virtual pairs in addition to the regular physical pairs using various techniques, such as SuperMIMO or "Phantom Mode." Phantom Mode is based on common mode technique. Further description regarding SuperMIMO can be found in U.S. Patent Pub. No. 2012/0219085, published on Aug. 30, 2012 and entitled "Extremely High Speed Broadband Access over Copper Pairs", which is incorporated herein by reference.

In the SuperMIMO system 900, crosstalk between virtual channels within one user, or between multiple users may be very strong. Because of TDMA-MIMO or FDMA-MIMO schemes disclosed herein, the strong crosstalks may be used in a positive way to enhance signals or signal components. Joint receiving may be done within subscriber lines for each user, and the multi-stream technology commonly used in the institute of electrical and electronics engineers (IEEE) 802.11 standard may be adapted here in combination with the TDMA-MIMO or FDMA-MIMO schemes. Further, between multiple users, beamforming may be used in the downstream direction to maximize signal magnitude, and MRC may be used in the upstream direction to maximize SNR ratios of intended signals.

Figure 10:
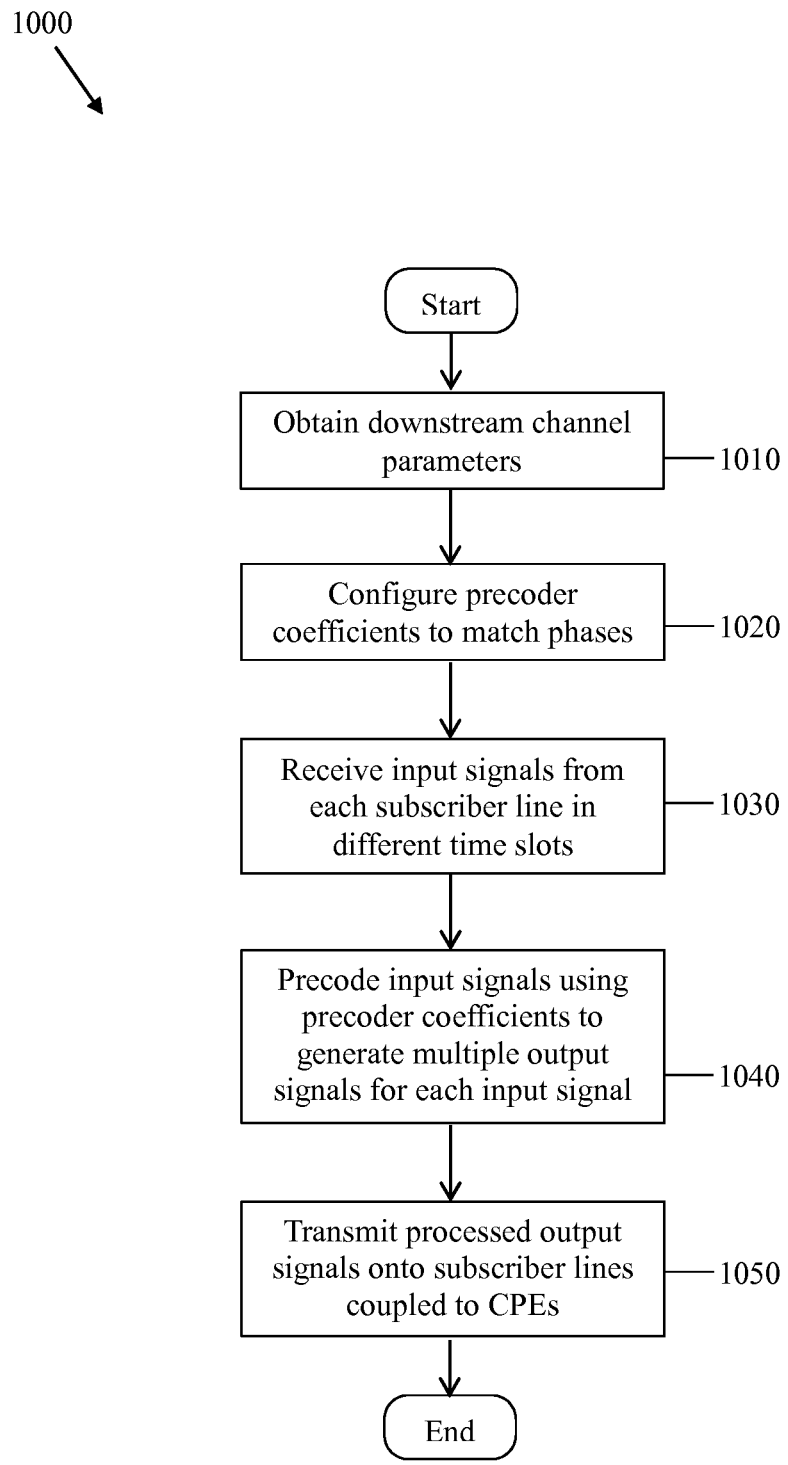
FIG. 10 illustrates an embodiment of a downstream TDMA-MIMO method.

FIG. 10 illustrates an embodiment of a downstream TDMA-MIMO method 1000, which may be implemented by a DSLAM. The method 1000 may start in step 1010, where a plurality of downstream channel parameters, including downstream transfer functions, and downstream FEXT coefficients, may be obtained. For example, with two subscriber lines as described above, in the obtained channel parameters, $h(1, 1, k)$ and $h(2, 2, k)$ refer to downstream channel transfer functions on subcarrier k, and wherein $h(1, 2, k)$ and $h(2, 1, k)$ refer to downstream FEXT coefficients on subcarrier k. Determination of channel parameters may use any appropriate technique, such as sending training sequences from the DSLAM to a CPE, and then feeding back from the CPE to the DSLAM to estimate the transfer functions and FEXT coefficients. Next, in step 1020, a plurality of precoder coefficients in a MIMO precoder may be configured using schemes described herein. In an embodiment, $p(1, 2, k)$ may be determined such that a phase of $h(2,1,k) \times p(1,2,k)$ and a phase of $h(1,1,k) \times p(1,1,k)$ are substantially equivalent. Similarly, $p(2, 1, k)$ may be determined such that a phase of $h(1,2,k) \times p(2,1, k)$ and a phase of $h(2,2,k) \times p(2,2,k)$ are substantially equivalent.

In step 1030, the DSLAM may receive one signal from a subscriber line coupled to a CO in each time slot. Only one input signal may be received by the DSLAM in each time slot. In step 1040, the DSLAM may precode the signals using the configured precoder coefficients. In an embodiment, as a result of precoding, each input signal may generate two or more output signals. Next, in step 1050, the DSLAM may transmit two linearly-related output signals in each time slot onto two subscriber lines which are coupled to two CPEs. For example, the DSLAM may be configured to transmit a first signal onto a first subscriber line in a first time slot and transmit a second signal onto a second subscriber line in the first time slot, wherein the first and second signals are linearly related and are intended for a first CPE. Further, the DSLAM may be configured to transmit a third signal onto the second subscriber line in a second time slot and transmit a fourth signal onto the first subscriber line in the second time slot, wherein the third and fourth signals are linearly related and are intended for a second CPE.

Figure 11:
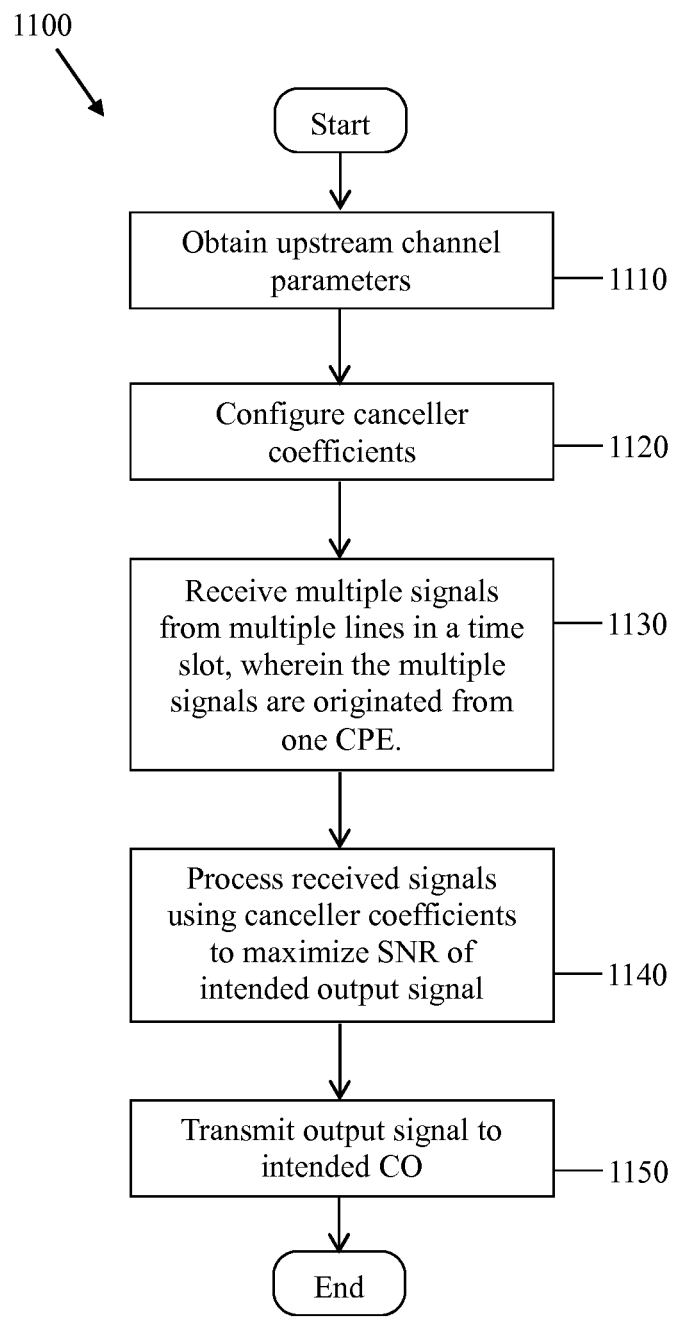
FIG. 11 illustrates an embodiment of an upstream TDMA-MIMO method.

FIG. 11 illustrates an embodiment of an upstream TDMA-MIMO method 1100, which may be implemented by a DSLAM. The method 1100 may start in step 1110, where a plurality of upstream channel parameters, including upstream transfer functions, and upstream FEXT coefficients, may be obtained. Determination of channel parameters may use any appropriate technique, such as sending training sequences from a CPE to the DSLAM to estimate the transfer functions and FEXT coefficients. Next, in step 1120, a plurality of canceller coefficients in a MIMO canceller may be configured using schemes described herein. In an embodiment, some of the canceller coefficients may be configured such that an output signal of the DSLAM may achieve a maximal SNR.

In step 1130, the DSLAM may receive a plurality of signals from subscriber lines coupled to a plurality of CPEs. For example, in a first time slot, the DSLAM may be configured to receive a first signal from a first subscriber line and receive a second signal from a second subscriber line, wherein the first and second signals are both intended for a first CO transceiver. Further, in a second time slot, the DSLAM may be configured to receive a third signal from the first subscriber line and receive a fourth signal from the second subscriber line, wherein the third and fourth signals are intended for a second CO transceiver. It should be noted that in each time slot, only one CPE may transmit an upstream signal. Thus, the first and second signals received in the first time slot may be originated from or based on one signal transmitted by a first CPE, and the third and fourth signals may be originated from or based on one other signal transmitted by a second CPE, wherein the first and second CPEs are configured to couple to the first and second subscriber lines respectively.

In step 1140, the DSLAM may process the received signals using the configured canceller coefficients. In an embodiment, the canceller may be configured to compute a fifth signal from the first and second signals, and compute a sixth signal from the third and fourth signals. In an embodiment, computing the fifth and sixth signals uses a MRC algorithm. Next, in step 1150, the DSLAM may transmit the fifth signal intended for the first CO transceiver in (or corresponding to) the first time slot, and transmit the sixth signal intended for the second CO transceiver in (or corresponding to) the second time slot.

Figure 12:
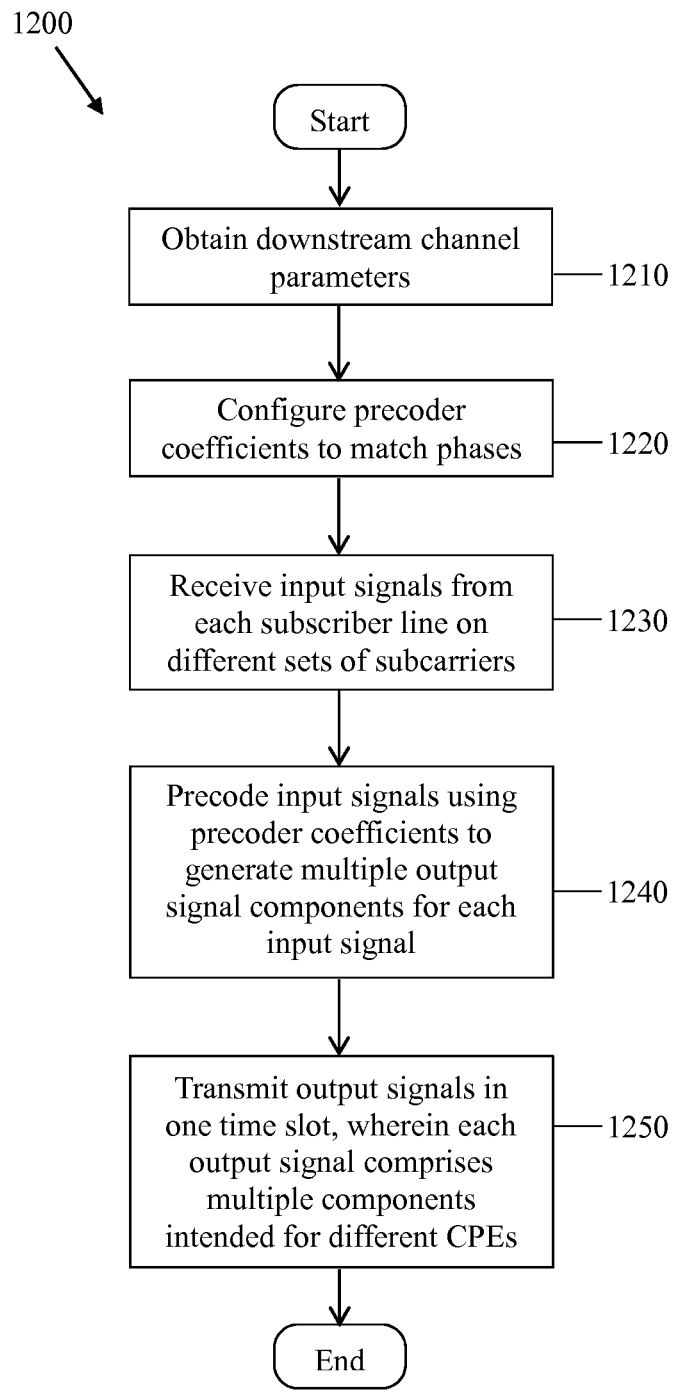
FIG. 12 illustrates an embodiment of a downstream FDMA-MIMO method.

FIG. 12 illustrates an embodiment of a downstream FDMA-MIMO method 1200, which may be implemented by a DSLAM. Similar to the method 1000, the method 1200 may start in step 1210, where a plurality of downstream channel parameters may be obtained for each subcarrier used in the downstream direction. Next, in step 1220, a plurality of precoder coefficients in a MIMO precoder may be configured using schemes described herein. For example, with two subscriber lines, $p(1, 2, k_1)$ may be determined such that a phase of $h(2,1,k_1) \times p(1,2,k_1)$ and a phase of $h(1,1,k_1) \times p(1,1,k_1)$ are substantially equivalent, and $p(2, 1, k_2)$ may be determined such that a phase of $h(1,2,k_2) \times p(2,1,k_2)$ and a phase of $h(2,2,k_2) \times p(2,2,k_2)$ are substantially equivalent. With N lines, each $p(j, i, k_j)$ may be determined such that each $h(i, j, k_j) \times p(j,i,k_j)$ has a substantially equivalent phase, wherein $p(j, i, k_j)$ denotes a precoder coefficient for a subcarrier k in a j-th set of subcarriers, and wherein $i, j=1,2,\ldots,N$.

In step 1230, the DSLAM may receive a signal from each subscriber line coupled to one or more COs. Frequency bands or subcarriers for each input line may be separated, so that each signal received by the DSLAM may be modulated on a different set of subcarriers. For example, one input signal received from a first subscriber line may comprise a first set of subcarriers, and one other input signal received from a second subscriber line may comprise a second set of subcarriers, wherein the first and second sets of subcarriers occupy different frequency bands. In step 1240, the DSLAM may precode the signals using the configured precoder coefficients. In an embodiment, as a result of precoding, each input signal may generate two or more output signal components. Next, in step 1250, in one time slot, the DSLAM may transmit an output signal onto each subscriber line, wherein all output signals are intended for CPEs. For example, the DSLAM may be configured to transmit a first signal onto a first subscriber line in a time slot and transmit a second signal onto a second subscriber line in the same time slot. A first component of the first signal and a first component of the second signal are generated based on the one input signal, thus they may be linearly related and intended for a first CPE. Similarly, a second component of the first signal and a second component of the second signal are generated based on one other input signal, thus they may be linearly related and intended for a second CPE.

Figure 13:
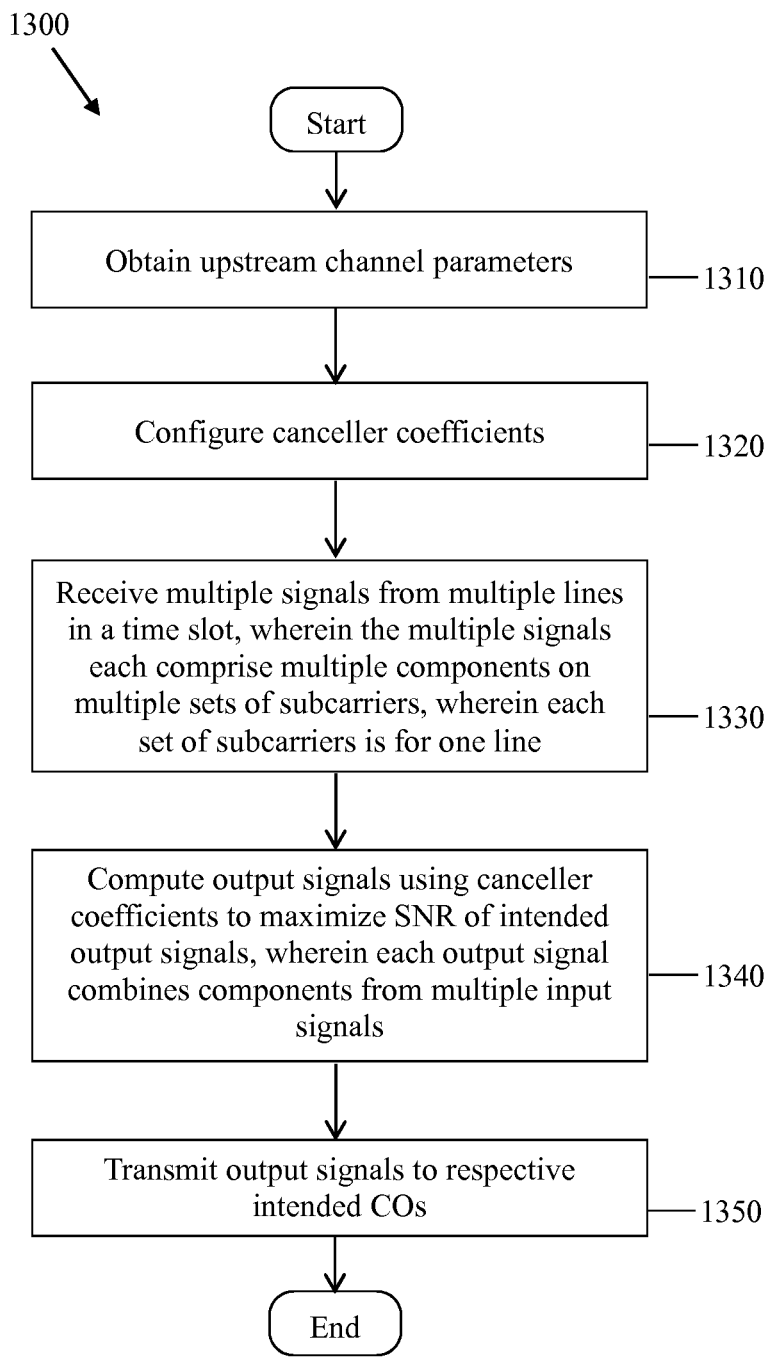
FIG. 13 illustrates an embodiment of an upstream FDMA-MIMO method.

FIG. 13 illustrates an embodiment of an upstream FDMA-MIMO method 1300, which may be implemented by a DSLAM. Similar to the method 1100, the method 1300 may start in step 1310, where a plurality of upstream channel parameters may be obtained. Next, in step 1320, a plurality of canceller coefficients in a canceller may be configured using schemes described herein. In step 1330, the DSLAM may simultaneously receive a plurality of signals from subscriber lines coupled to a plurality of CPEs. Signals received from each line may correspond to a different frequency band or set of subcarriers. For example, the DSLAM may be configured to receive a first signal from a first subscriber line in a time slot, and receive a second signal from a second subscriber line in the same time slot. Further, a first component of the first signal and a first component of the second signal may comprise a first set of subcarriers and are intended for a first CO transceiver, and a second component of the first signal and a second component of the second signal may comprise a second set of subcarriers and are intended for a second CO transceiver. The first and second sets of subcarriers occupy different frequency bands. Moreover, the first component of the first signal and the first component of the second signal may be originated from or based on one signal transmitted by a first CPE, and the second component of the first signal and the second component of the second signal may be originated from or based on one other signal transmitted by a second CPE. A signal may bring about two or more signal components due to FEXT in the upstream channel.

In step 1340, the DSLAM may process the received signals using the configured canceller coefficients. In an embodiment, the canceller may be configured to compute a third signal from the first component of the first signal and the first component of the second signal, and compute a fourth signal from the second component of the first signal and the second component of the second signal. In an embodiment, computing the third and fourth signals uses a MRC algorithm. Next, in step 1350, the DSLAM may transmit the third signal intended for the first CO transceiver, and transmit the fourth signal intended for the second CO transceiver.

It should be noted that some of the disclosed methods may be used in a combined fashion in a DSLAM. For example, the methods 1000 and 1100, or the methods 1200 and 1300 may be combined to facilitate data communication in both downstream and upstream directions. Further, additional steps, although not shown, may also be incorporated wherever appropriate into the disclosed methods.

Figure 14:
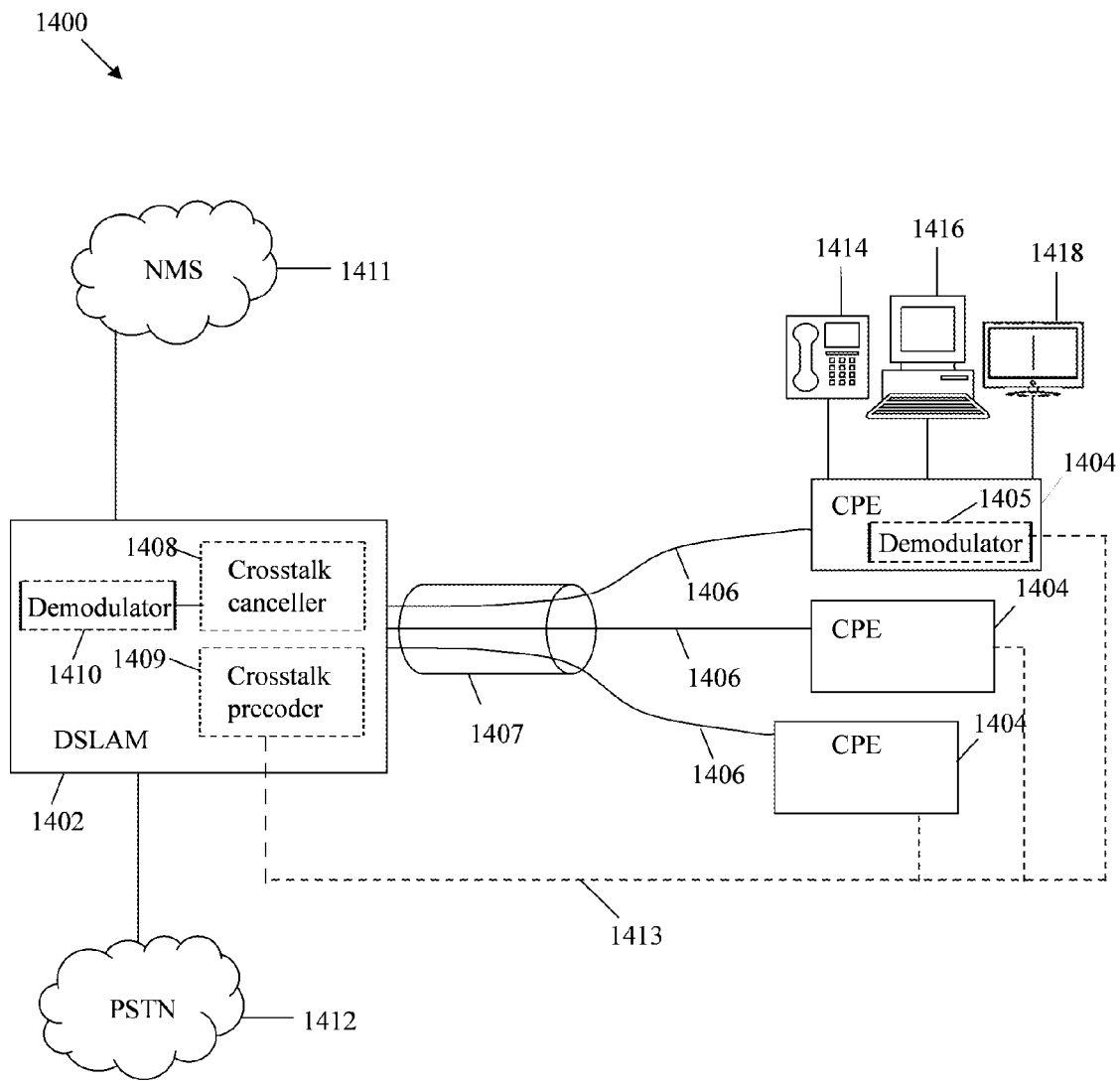
FIG. 14 illustrates an embodiment of a DSL system.

FIG. 14 illustrates a schematic diagram of an embodiment of a DSL system 1400, in which embodiments of the present disclosure may be implemented. The DSL system 1400 may be a VDSL2 system, an ADSL2 system, an ADSL2+ system, or any other DSL system (e.g., systems to be defined in the ITU-T G.fast standard). The DSL system 1400 may comprise a DSLAM 1402 and a plurality of CPEs 1404, which may be coupled to the DSLAM 1402 via a plurality of subscriber lines 1406. The DSLAM 1402 may be located on an operator end of the DSL system 1400, such as a central office (CO), an exchange, a distribution center, or a cabinet. The CPEs 1404 may be located on a remote or subscriber end. At least some of the subscriber lines 1406 may be bundled in a binder 1407. In an embodiment, the DSLAM 1402 comprises a crosstalk canceller 1408, which may be configured to reduce or cancel upstream FEXT, and a crosstalk precoder (or vector precoder) 1409, which may be configured to reduce or cancel downstream FEXT. The canceller 1408 may be coupled to a demodulator 1410, which may comprise a FEQ and a constellation decoder. In estimation of upstream FEXT channels, the demodulator 1410 may be configured to generate error signals based on an upstream signal, which is induced by upstream FEXT. The crosstalk precoder 1409 may pre-distort downstream signals, which are then transmitted downstream to the CPEs 1404 via the subscriber lines 1406.

Each of the CPEs 1404 may comprise a demodulator 1405, which may be configured to equalize the downstream signals and generate an error signal comprising error vectors. The demodulator 1405 may be coupled to the crosstalk precoder 1409 via a plurality of feedback channels 1413. Feedback symbols comprising the error signal may be transmitted from a CPE 1404 to the DSLAM 1402. The feedback channels 1413 (shown in dotted lines) may correspond to upstream logical data paths from the CPEs 1404 to the DSLAM 1402 and may not be physically separated from the subscriber lines 1406 (shown in solid lines). The CPEs 1404 may transmit the error feedback signals in the feedback channels 1413 through the subscriber lines 1406 to a plurality of corresponding receivers in the DSLAM 1402, which may then extract the error signals from the upstream data stream. Additionally, the DSLAM system 1402 may optionally comprise a network management system (NMS) 1411 and a public switched telephone network (PSTN) 1412. The NMS 1411 may be a network management infrastructure that processes data exchanged with the DSLAM 1402 and may be coupled to one or more broadband networks, such as the Internet. The PSTN 1412 may be a network that generates, processes, and receives voice or other voice-band signals.

The crosstalk precoder 1409 may be configured to reduce or limit the crosstalk in the lines. The crosstalk precoder 1409 may transmit pre-distorted downstream signals in the subscriber lines 1406 to cancel or reduce crosstalk error in the lines. The crosstalk precoder 1409 may process a plurality of downstream signals from a transmitter in the DSLAM 1402, add distortion to the downstream signals, and transmit the pre-distorted downstream signals to the CPEs 1404 via the subscriber lines 1406. The pre-distorted signals may be generated by the crosstalk precoder 1409 whose parameters are properly chosen to minimize the crosstalk in the downstream channels. In order for the crosstalk precoder to select the appropriate parameters, the CPEs 1404 may send back the error signals in the downstream receivers as feedback for the precoder 1409 to estimate downstream crosstalk and update its parameters. For instance, a plurality of transceivers at the CPEs 1404 may measure the errors for a plurality of received symbols, such as digital multi-tone (DMT) symbols, from the crosstalk precoder 1409, and transmit back to the DSLAM a plurality of corresponding error feedback signals, via the feedback channel 1413. The feedback channel 1413 may be established through upstream data signal paths from the CPEs 1404 to the DSLAM 1402, which may be provided in addition to upstream communications data.

In other embodiments, the DSLAM 1402 may be modified to include splitters, filters, management entities, and various other hardware, software, and functionality. For example, the DSLAM 1402 may comprise switches and/or splitters, which may couple the NMS 1411, the PSTN 1412, and the subscriber lines 1406. For instance, the splitter may be a 2:1 coupler that forwards data signals received from the subscriber lines 1406 to the NMS 1411 and the PSTN 1412, and forwards data signals received from the NMS 1411 and the PSTN 1412 to the subscriber lines 1406. Further, the splitter may optionally comprise one or more filters to help direct data signals between the NMS 1411, the PSTN 1412, and the subscriber lines 1406. Additionally, the DSLAM 1402 may comprise at least one DSL transmitter/receiver (transceiver), each of which is referred to as an xTU-C. The xTU-C (e.g., a master modem) may exchange signals between the NMS 1411, the PSTN 1412, and the subscriber lines 1406.

In an embodiment, the CPEs 1404 may be located at the customer premises, where at least some of the CPEs 1404 may be coupled to a telephone 1414, a computer 1416, and/or a television 1418. The telephone 1414 may be hardware, software, firmware, or combinations thereof that generates, processes, and receives voice or other voice-band signals. The CPE 1404 may comprise a switch and/or a splitter, which may couple the subscriber lines 1406 and the telephone 1414, the computer 1416, and the television 1418.

Figure 15:
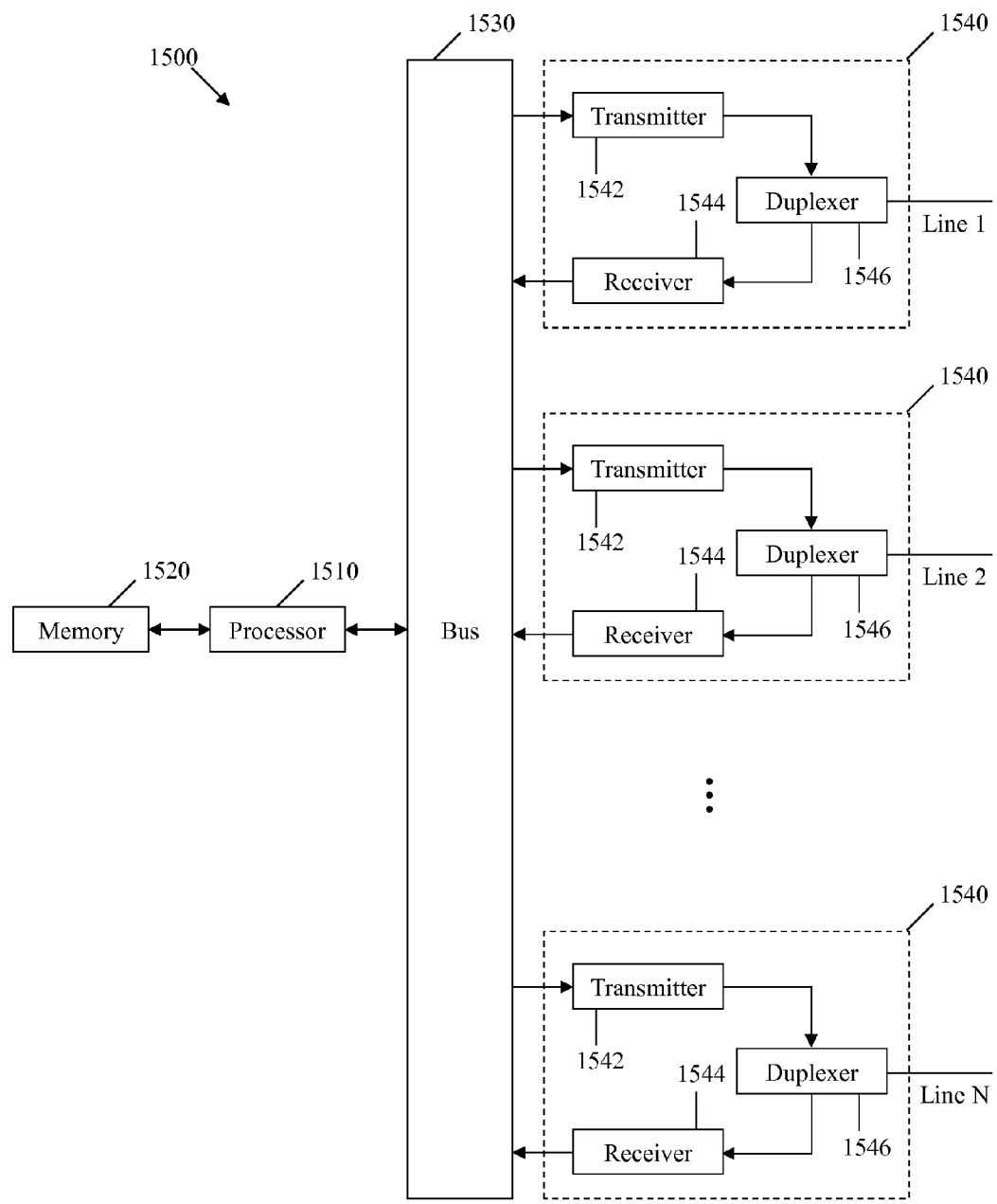
FIG. 15 illustrates an embodiment of a DSLAM.

FIG. 15 illustrates an embodiment of a DSLAM 1500, which may be suitable for implementing one or more embodiments of the methods disclosed herein, such as the downstream TDMA-MIMO scheme 500, the upstream TDMA-MIMO scheme 600, the downstream FDMA-MIMO scheme 700, the upstream FDMA-MIMO scheme 800, the downstream TDMA-MIMO method 1000, the upstream TDMA-MIMO method 1100, the downstream FDMA-MIMO method 1200, the upstream FDMA-MIMO method 1300. The DSLAM 1500 may comprise a processor 1510, a memory 1520, a bus 1530, and N transceiver units 1540, where N is an integer greater than one. Each transceiver unit 1540 may be coupled to a subscriber line and comprise a transmitter 1542, a receiver 1544, and a duplexer 1546.

The processor 1510 (which may be referred to as a central processor unit or CPU) may be in communication with the memory 1520. Although illustrated as a single processor, the processor 1510 may be implemented as one or more CPU chips, one or more cores (e.g., a multi-core processor), one or more application specific integrated circuits (ASICs), and/or one or more digital signal processors (DSPs). The processor 1510 may be configured to implement any of the schemes described herein, including the downstream TDMA-MIMO scheme 500, the upstream TDMA-MIMO scheme 600, the downstream FDMA-MIMO scheme 700, the upstream FDMA-MIMO scheme 800, the downstream TDMA-MIMO method 1000, the upstream TDMA-MIMO method 1100, the downstream FDMA-MIMO method 1200, the upstream FDMA-MIMO method 1300. The processor 1510 may be implemented using hardware, software, or both. The memory 1520 may be configured to store data and program instructions. Data or program instructions stored in the memory 1520 may be loaded into processor 1510 to convert a general-purpose processor into a special-purpose processor for implementing the schemes described herein. The memory 1520 may comprise, random access memory (RAM), read only memory (ROM), and/or secondary storage (e.g., disk drive or tape drive). The bus 1530 may be configured to facilitate communication between the processor 1510 and the transceiver units 1540. Through the bus 1530, two or more of the transceiver units 1540 may receive or transmit data at the same time or at different times. As an alternative embodiment, the shared bus 1530 may be replaced by a switch or switching fabric connecting the processor 1510 to the transceiver units 1540.

Each transceiver unit 1540 may be coupled a subscriber line and configured to transmit data onto or receive data from the subscriber line. For example, for Line 1 shown in FIG. 15, the transmitter 1542 may be configured to send an analog signal to the duplexer 1546, which may then transmit the analog signal onto Line 1. The duplexer 1546 may function as a switch. In a receiving time slot, the duplexer 1546 may receive an analog signal from Line 1, and relay the signal to the receiver 1544.

It should be noted that FIG. 15 may include only part of all components in a DSLAM, thus other components, such as a modulator, demodulator, noise canceller, etc., may also be included separately, if they are not included in as functions of the processor 1510. The transceiver units 1540 may perform physical layer functions, such as modulation and demodulation (including equalization) of symbols, forward error control, etc.

Compared to the DSLAM 1500, a CPE may comprise a smaller number of transceivers (e.g., one transceiver). Functioning of a CPE transceiver may be similar to the transceiver unit 1540. One skilled in the art would recognize how to implement the disclosed schemes into the CPE transceiver, thus its implementation will not be further described in the interest of conciseness.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, ..., 70 percent, 71 percent, 72 percent, ..., 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A digital subscriber line access multiplexer (DSLAM) configured to couple to a first subscriber line and a second subscriber line, wherein the DSLAM comprises:
    at least one transmitter configured to:
        transmit a first signal onto the first subscriber line in a first time slot;
        transmit a second signal onto the second subscriber line in the first time slot, wherein the first and second signals are linearly related and are intended for a first customer premise equipment (CPE);
        transmit a third signal onto the second subscriber line in a second time slot; and
        transmit a fourth signal onto the first subscriber line in the second time slot, wherein the third and fourth signals are linearly related and are intended for a second CPE; and
    a precoder configured to:
        compute the first and second signals based on a first input signal received by the DSLAM; and
        compute the third and fourth signals based on a second input signal received by the DSLAM,
    wherein the first and second input signals are received by the DSLAM in different time slots.

2. The DSLAM of claim 1, wherein the precoder comprises a plurality of precoder coefficients, and wherein some of the precoder coefficients are configured such that signals received by the first and second CPEs have maximal magnitudes.

3. The DSLAM of claim 1, wherein the precoder comprises a plurality of precoder coefficients denoted as $p(1,1,k)$, $p(1,2,k)$, $p(2,1,k)$, and $p(2,2,k)$, wherein k denotes a subcarrier index, wherein $Z_1(t_1)$ and $Z_2(t_2)$ denote the first input signal and the second input signal respectively, wherein $t_1$ and $t_2$ denote the first and second time slots respectively, wherein $Z'_1(t_1)$, $Z'_2(t_1)$, $Z'_2(t_2)$, and $Z'_1(t_2)$ denote the first, second, third, and fourth signals respectively, and wherein computing the first, second, third, and fourth signals uses equations:

$$Z'_1(t_1) = p(1,1,k) \times Z_1(t_1),$$

$$Z'_2(t_1) = p(1,2,k) \times Z_1(t_1),$$

$$Z'_1(t_2) = p(2,1,k) \times Z_2(t_2), \text{ and}$$

$$Z'_2(t_2) = p(2,2,k) \times Z_2(t_2).$$

4. The DSLAM of claim 3, wherein $p(1, 2, k)$ is determined such that a phase of $h(2,1,k) \times p(1,2,k)$ and a phase of $h(1,1,k) \times p(1,1,k)$ are substantially equivalent, and wherein $p(2, 1, k)$ is determined such that a phase of $h(1,2,k) \times p(2,1,k)$ and a phase of $h(2,2,k) \times p(2,2,k)$ are substantially equivalent, wherein $h(1,1,k)$ and $h(2,2,k)$ refer to downstream channel transfer functions on subcarrier k, and wherein $h(1,2,k)$ and $h(2,1,k)$ refer to downstream far-end crosstalk (FEXT) coefficients on subcarrier k.

5. The DSLAM of claim 4, wherein a magnitude of $p(1, 2, k)$ is no greater than a magnitude of $p(1,1,k)$, and wherein a magnitude of $p(2,1,k)$ is no greater than a magnitude of $p(2,2,k)$.

6. The DSLAM of claim 1, further configured to couple to N subscriber lines including the first and second subscriber lines, wherein N is an integer greater than two, wherein the precoder comprises a plurality of precoder coefficients denoted as $p(j, i, k)$ for a subcarrier k, wherein a plurality of downstream channel parameters corresponding to the N subscriber lines are denoted as $h(j, i, k)$ for the subcarrier k, wherein $i, j = 1,2,\ldots,N$, and wherein each $p(j, i, k)$ is determined such that each $h(i, j, k) \times p(j, i, k)$ has an equivalent phase.

7. The DSLAM of claim 1, further configured to couple to a group of subscriber lines including the first and second subscriber lines, wherein the group of subscriber lines comprises a subgroup with N subscriber lines, wherein N is an integer greater than one, wherein the precoder comprises a plurality of precoder coefficients corresponding to the subgroup, wherein the plurality of precoder coefficients are denoted as $p(j, i, k)$ for a subcarrier k, wherein a plurality of downstream channel parameters corresponding to the subgroup are denoted as $h(j, i, k)$ for the subcarrier k, wherein $i, j=1,\ldots,N$, and wherein each $p(j, i, k)$ is determined such that each $h(i, j, k) \times p(j, i, k)$ has an equivalent phase.

8. The DSLAM of claim 1, implemented in a SuperMIMO system.

9. A digital subscriber line access multiplexer (DSLAM) configured to couple to a first subscriber line and a second subscriber line, wherein the DSLAM comprises at least one receiver configured to:
   receive a first signal from the first subscriber line in a first time slot;
   receive a second signal from the second subscriber line in the first time slot, wherein the first and second signals are intended for a first central office (CO) transceiver;
   receive a third signal from the first subscriber line in a second time slot; and
   receive a fourth signal from the second subscriber line in the second time slot, wherein the third and fourth signals are intended for a second CO transceiver,
   wherein the first and second signals are originated from one signal transmitted by a first customer premise equipment (CPE), wherein the third and fourth signals are originated from one other signal transmitted by a second CPE, wherein the first and second CPEs are configured to couple to the first and second subscriber lines respectively, and wherein the one signal and the one other signal are transmitted in different time slots.

10. The DSLAM of claim 9, further comprising:
   a canceller configured to:
      compute a fifth signal from the first and second signals; and
      compute a sixth signal from the third and fourth signals; and
   at least one transmitter configured to:
      transmit the fifth signal intended for the first CO transceiver; and
      transmit the sixth signal intended for the second CO transceiver.

11. The DSLAM of claim 10, wherein computing the fifth and sixth signals uses a plurality of canceller coefficients, and wherein some of the canceller coefficients are configured such that the fifth and sixth signals have a maximal signal-to-noise ratio (SNR).

12. The DSLAM of claim 11, wherein computing the fifth and sixth signals uses a maximal ratio combining (MRC) algorithm.

13. The DSLAM of claim 12, further configured to couple to a group of subscriber lines, wherein the first and second subscriber lines belong to a subgroup of the group of subscriber lines.

* * * * *